(12) United States Patent
Swigart et al.

(10) Patent No.: US 9,144,268 B2
(45) Date of Patent: Sep. 29, 2015

(54) STRAND-WOUND BLADDER

(75) Inventors: John F. Swigart, Portland, OR (US);
Mario A. Lafortune, Tigard, OR (US);
Amy E. Gishifu, Vancouver, WA (US);
Ty A. Ransom, Portland, OR (US);
Nicola Jane Reynolds, Hillsboro, OR (US); Britani N. Blackstone, Columbus, OH (US)

(73) Assignee: NIKE, Inc., Beaverton, OR (US)

( * ) Notice: Subject to any disclaimer, the term of this patent is extended or adjusted under 35 U.S.C. 154(b) by 804 days.

(21) Appl. No.: 12/938,217

(22) Filed: Nov. 2, 2010

(65) Prior Publication Data
US 2012/0102783 A1   May 3, 2012

(51) Int. Cl.
*A43B 21/28* (2006.01)
*A43B 13/18* (2006.01)
*A43B 13/20* (2006.01)

(52) U.S. Cl.
CPC ............... *A43B 13/206* (2013.01); *A43B 13/20* (2013.01); *A43B 13/203* (2013.01); *Y10T 29/49826* (2015.01); *Y10T 428/1352* (2015.01)

(58) Field of Classification Search
CPC .... A43B 3/0063; A43B 7/105; A43B 13/182; A43B 13/188; A43B 13/189; A43B 13/20; A43B 13/203
USPC ........... 36/83, 37, 29, 88, 93, 153, 154, 35 B, 36/3 B, 27, 28; 428/357, 222, 297.4, 297.7, 428/68, 76; 606/194, 198; 623/1.11, 17.12
See application file for complete search history.

(56) References Cited

U.S. PATENT DOCUMENTS

| 3,426,891 | A | * | 2/1969 | Marks | 410/119 |
| 4,183,156 | A |   | 1/1980 | Rudy |  |
| 4,191,375 | A | * | 3/1980 | Uruba et al. | 473/609 |
| 4,217,705 | A |   | 8/1980 | Donzis |  |
| 4,219,945 | A | * | 9/1980 | Rudy | 36/29 |
| 4,340,626 | A |   | 7/1982 | Rudy |  |
| 4,657,716 | A |   | 4/1987 | Schmidt |  |
| 4,906,502 | A | * | 3/1990 | Rudy | 428/69 |
| 4,936,029 | A | * | 6/1990 | Rudy | 36/29 |
| 5,036,603 | A | * | 8/1991 | Dischler | 36/44 |

(Continued)

FOREIGN PATENT DOCUMENTS

| CN | 2113080 U | 8/1992 |
| CN | 2176037 Y | 9/1994 |

(Continued)

OTHER PUBLICATIONS

International Search Report in PCT Application No. PCT/US2011/058634, mailed on Apr. 23, 2012.

*Primary Examiner* — Clinton T. Ostrup
*Assistant Examiner* — Cameron A Carter
(74) *Attorney, Agent, or Firm* — Banner & Witcoff, Ltd.

(57) ABSTRACT

An article of footwear or another product may incorporate a pressure chamber that includes (a) a bladder at least partially formed from a polymer material that is sealed to enclose a pressurized fluid and (b) a strand wound around the bladder and secured to the bladder. In manufacturing the pressure chamber, a bladder with an elongate configuration may be formed. A strand is wound around the bladder, and the strand is secured to the bladder. When incorporated to a sole structure of the article of footwear, for example, a portion of the bladder that includes the strands may be exposed at an outer surface of the sole structure.

21 Claims, 25 Drawing Sheets

(56) References Cited

U.S. PATENT DOCUMENTS

| | | | |
|---|---|---|---|
| 5,042,176 A | 8/1991 | Rudy | |
| 5,443,529 A * | 8/1995 | Phillips | 623/56 |
| 5,543,194 A * | 8/1996 | Rudy | 428/69 |
| 5,713,141 A | 2/1998 | Mitchell et al. | |
| 5,729,917 A * | 3/1998 | Slepian et al. | 36/27 |
| 5,741,568 A * | 4/1998 | Rudy | 428/69 |
| 5,755,001 A | 5/1998 | Potter et al. | |
| 5,952,065 A | 9/1999 | Mitchell et al. | |
| 5,987,780 A | 11/1999 | Lyden et al. | |
| 5,993,585 A * | 11/1999 | Goodwin et al. | 156/145 |
| 6,013,340 A | 1/2000 | Bonk et al. | |
| 6,082,025 A | 7/2000 | Bonk et al. | |
| 6,119,371 A * | 9/2000 | Goodwin et al. | 36/29 |
| 6,127,010 A * | 10/2000 | Rudy | 428/35.7 |
| 6,127,026 A | 10/2000 | Bonk et al. | |
| 6,203,868 B1 | 3/2001 | Bonk et al. | |
| 6,289,558 B1 | 9/2001 | Hammerslag | |
| 6,321,465 B1 | 11/2001 | Bonk et al. | |
| 6,374,514 B1 * | 4/2002 | Swigart | 36/35 B |
| 6,665,958 B2 * | 12/2003 | Goodwin | 36/29 |
| 6,752,205 B2 | 6/2004 | Kutac et al. | |
| 6,786,919 B1 * | 9/2004 | Escano et al. | 623/1.13 |
| 6,837,951 B2 | 1/2005 | Rapaport | |
| 7,070,845 B2 * | 7/2006 | Thomas et al. | 428/69 |
| 7,086,180 B2 * | 8/2006 | Dojan et al. | 36/29 |
| 7,132,032 B2 * | 11/2006 | Tawney et al. | 156/290 |
| 7,294,145 B2 * | 11/2007 | Ward | 623/1.11 |
| 7,395,614 B1 | 7/2008 | Bailey, Sr. et al. | |
| 7,523,565 B1 * | 4/2009 | Chen | 36/29 |
| 7,591,050 B2 | 9/2009 | Hammerslag | |
| 7,676,955 B2 * | 3/2010 | Dojan et al. | 36/29 |
| 7,967,854 B2 * | 6/2011 | Chandrasekaran et al. | 623/1.34 |
| 8,574,283 B1 * | 11/2013 | Kamat | 623/1.11 |
| 2001/0018595 A1 * | 8/2001 | Israel et al. | 606/198 |
| 2003/0192200 A1 * | 10/2003 | Dixon | 36/27 |
| 2004/0053717 A1 * | 3/2004 | Awan | 473/604 |
| 2005/0039346 A1 * | 2/2005 | Thomas et al. | 36/29 |
| 2005/0107182 A1 | 5/2005 | Meyer et al. | |
| 2006/0225304 A1 * | 10/2006 | Goodwin | 36/35 B |
| 2008/0005931 A1 | 1/2008 | Ellis | |
| 2008/0022556 A1 | 1/2008 | Ellis | |
| 2008/0051234 A1 | 2/2008 | Nagao et al. | |
| 2008/0086916 A1 | 4/2008 | Ellis | |
| 2008/0097301 A1 * | 4/2008 | Alpini et al. | 604/103.07 |
| 2008/0263899 A1 * | 10/2008 | Lee | 36/102 |
| 2008/0313928 A1 * | 12/2008 | Adams et al. | 36/103 |
| 2009/0094858 A1 * | 4/2009 | Ungari et al. | 36/88 |
| 2011/0131831 A1 * | 6/2011 | Peyton et al. | 36/29 |

FOREIGN PATENT DOCUMENTS

| | | |
|---|---|---|
| CN | 1194874 A | 10/1998 |
| CN | 2329393 Y | 7/1999 |

\* cited by examiner

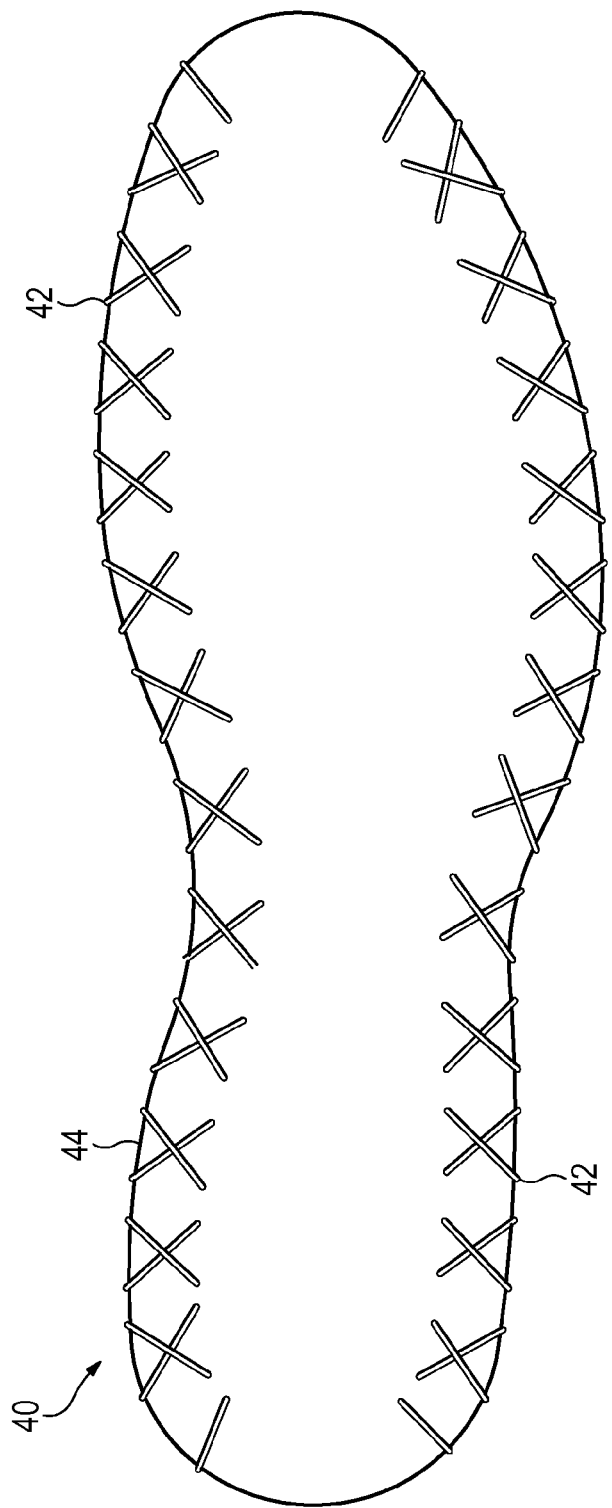
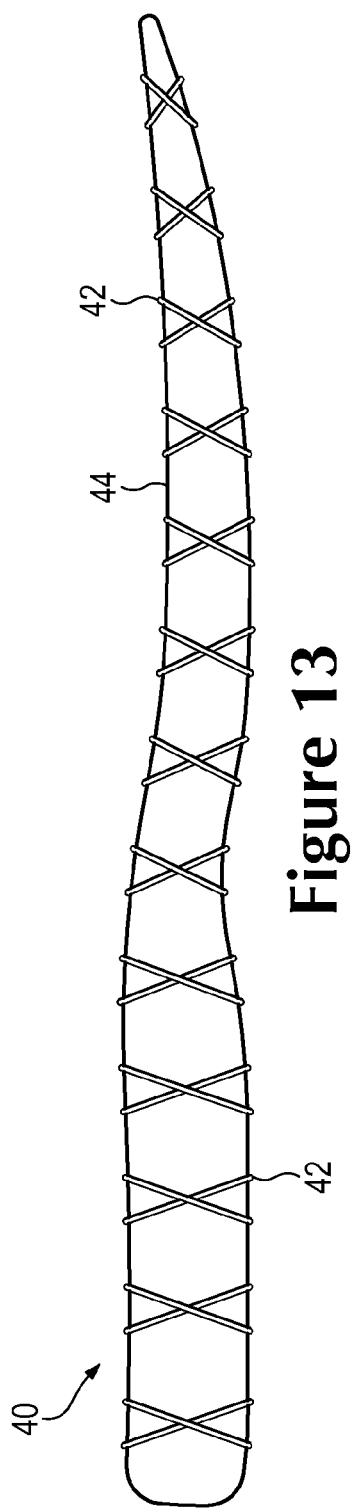
Figure 12
Figure 13

STRAND-WOUND BLADDER

BACKGROUND

Conventional articles of athletic footwear include two primary elements, an upper and a sole structure. The upper is generally formed from a plurality of elements (e.g., textiles, foam, leather, synthetic leather) that are stitched or adhesively bonded together to form an interior void for securely and comfortably receiving a foot. The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole may also incorporate a fluid-filled chamber that increases durability of the footwear and enhances ground reaction force attenuation of the sole structure. In some footwear configurations, the fluid-filled chamber may be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al. In other footwear configurations, the fluid-filled chamber may substantially replace the polymer foam, as in U.S. Pat. No. 7,086,180 to Dojan, et al. In general, the fluid-filled chambers are formed from an elastomeric polymer material that is sealed and pressurized, but may also be substantially unpressurized or pressurized by an external source. In some configurations, textile or foam tensile members may be located within the chamber, or reinforcing structures may be bonded to an exterior surface of the chamber to impart shape to or retain an intended shape of the chamber.

Fluid-filled chambers suitable for footwear applications may be manufactured by a two-film technique, in which two separate sheets of elastomeric film are bonded together to form a peripheral bond on the exterior of the chamber and to form a generally sealed structure. The sheets are also bonded together at predetermined interior areas to give the chamber a desired configuration. That is, interior bonds (i.e., bonds spaced inward from the peripheral bond) provide the chamber with a predetermined shape and size upon pressurization. In order to pressurize the chamber, a nozzle or needle connected to a fluid pressure source is inserted into a fill inlet formed in the chamber. Following pressurization of the chamber, the fill inlet is sealed and the nozzle is removed. A similar procedure, referred to as thermoforming, may also be utilized, in which a heated mold forms or otherwise shapes the sheets of elastomeric film during the manufacturing process.

Chambers may also be manufactured by a blowmolding technique, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration. As with the two-film technique, a nozzle or needle connected to a fluid pressure source is inserted into a fill inlet formed in the chamber in order to pressurize the chamber. Following pressurization of the chamber, the fill inlet is sealed and the nozzle is removed.

SUMMARY

Various features of a pressure chamber, which may be incorporated into articles of footwear and other products, are disclosed below. The pressure chamber includes a bladder at least partially formed from a polymer material that is sealed to enclose a pressurized fluid. Additionally, the pressure chamber includes a strand wound entirely around the bladder and secured to the bladder.

A method of manufacturing a pressure chamber is also disclosed below. The method includes forming a bladder with an elongate configuration. A strand is wound around the bladder, and the strand is secured to the bladder. Additionally, the bladder may be incorporated into a sole structure of an article of footwear, and at least a portion of the bladder that includes the strand is exposed at an outer surface of the sole structure.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 12 is a top plan view of yet another configuration of the pressure chamber.

FIG. 13 is a side elevational view of the pressure chamber depicted in FIG. 12.

DETAILED DESCRIPTION

The following discussion and accompanying figures disclose various configurations of pressure chambers, which have the structures of strand-wound bladders. Concepts related to the pressure chambers are disclosed with reference to an article of footwear having a configuration that is suitable for running. However, the pressure chambers are not limited to footwear designed for running, and may be utilized with a wide range of athletic footwear styles, including baseball shoes, basketball shoes, cross-training shoes, football shoes, golf shoes, soccer shoes, tennis shoes, and walking shoes, for example. The pressure chambers may also be utilized with footwear styles that are generally considered to be non-athletic, including dress shoes, loafers, sandals, and boots. The concepts disclosed herein may apply, therefore, to a wide variety of footwear styles. In addition to footwear, concepts associated with the pressure chambers may also be applied to a variety of other products.

General Footwear Structure

Figure 1:
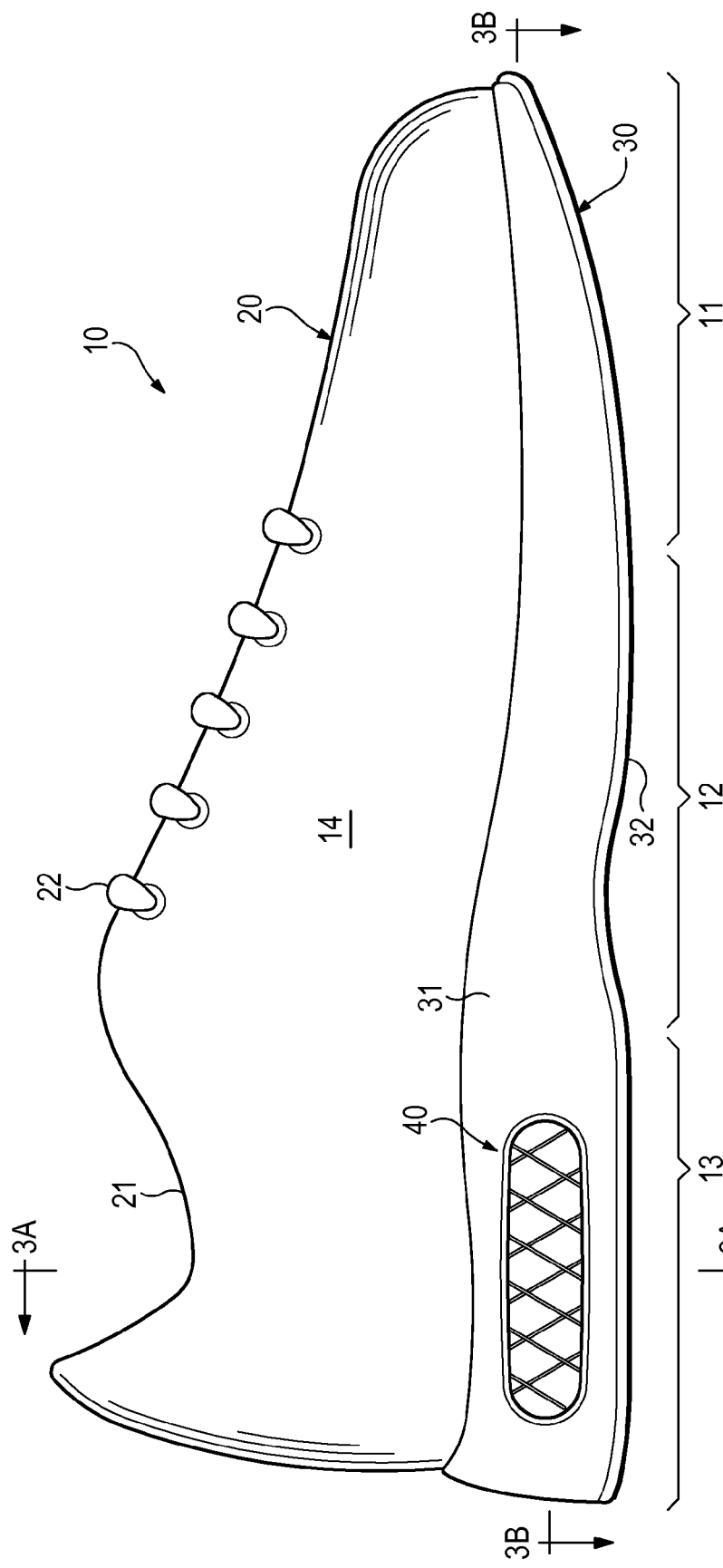
FIG. 1 is a lateral side elevational view of an article of footwear.
Figure 2:
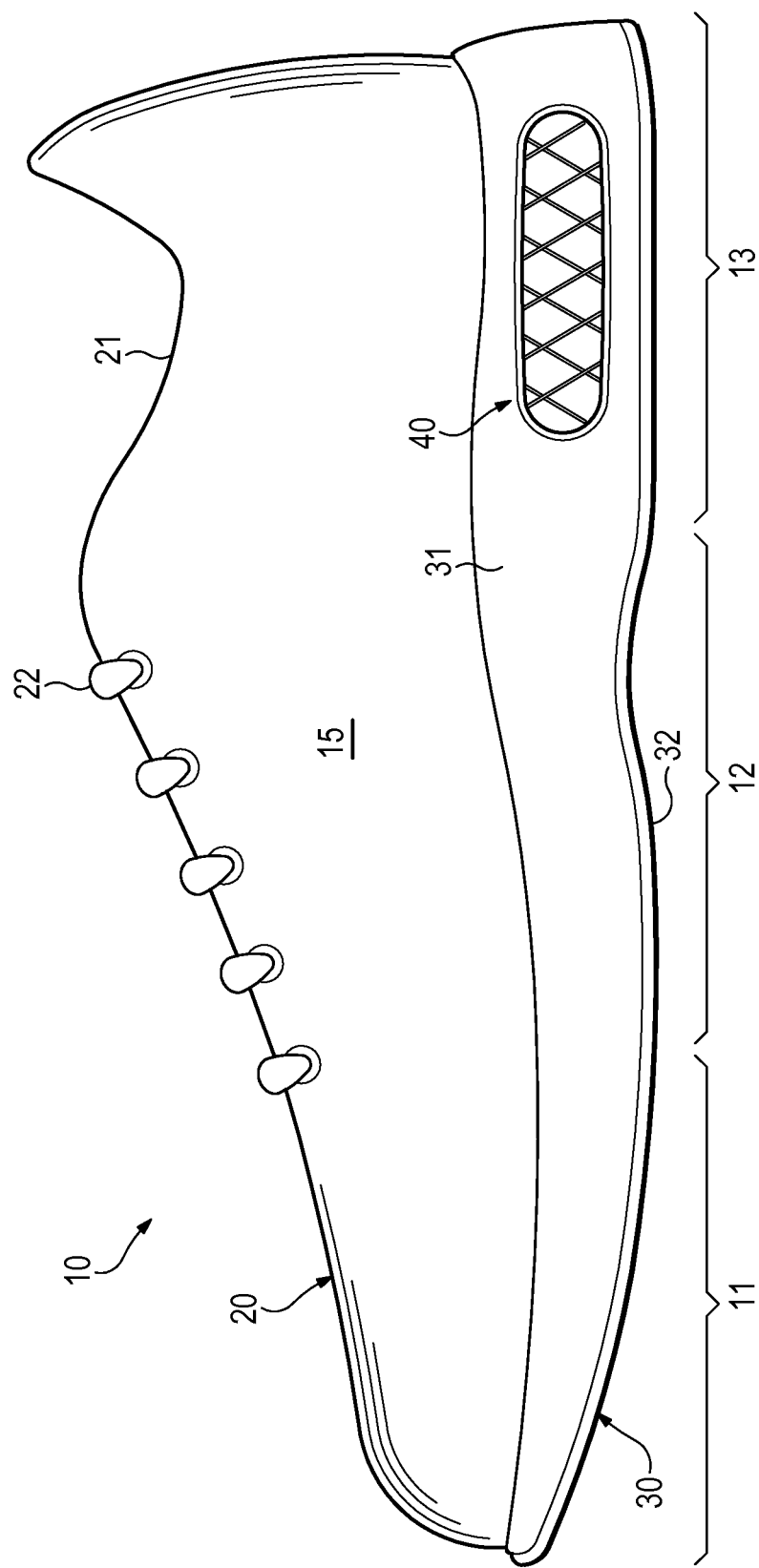
FIG. 2 is a medial side elevational view of the article of footwear.
Figure 3A:
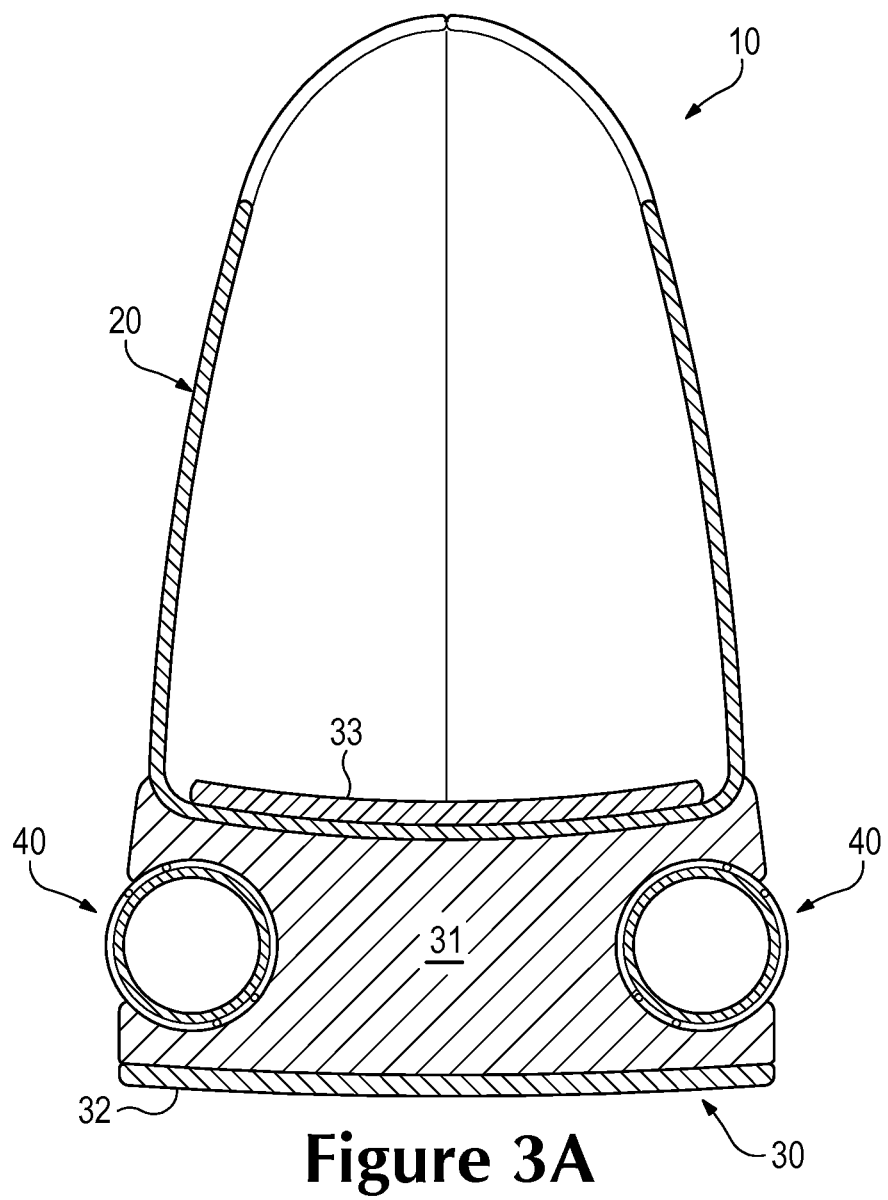
FIGS. 3A and 3B are cross-sectional views of the article of footwear, as defined by section lines 3A and 3B in FIG. 1.
Figure 3B:
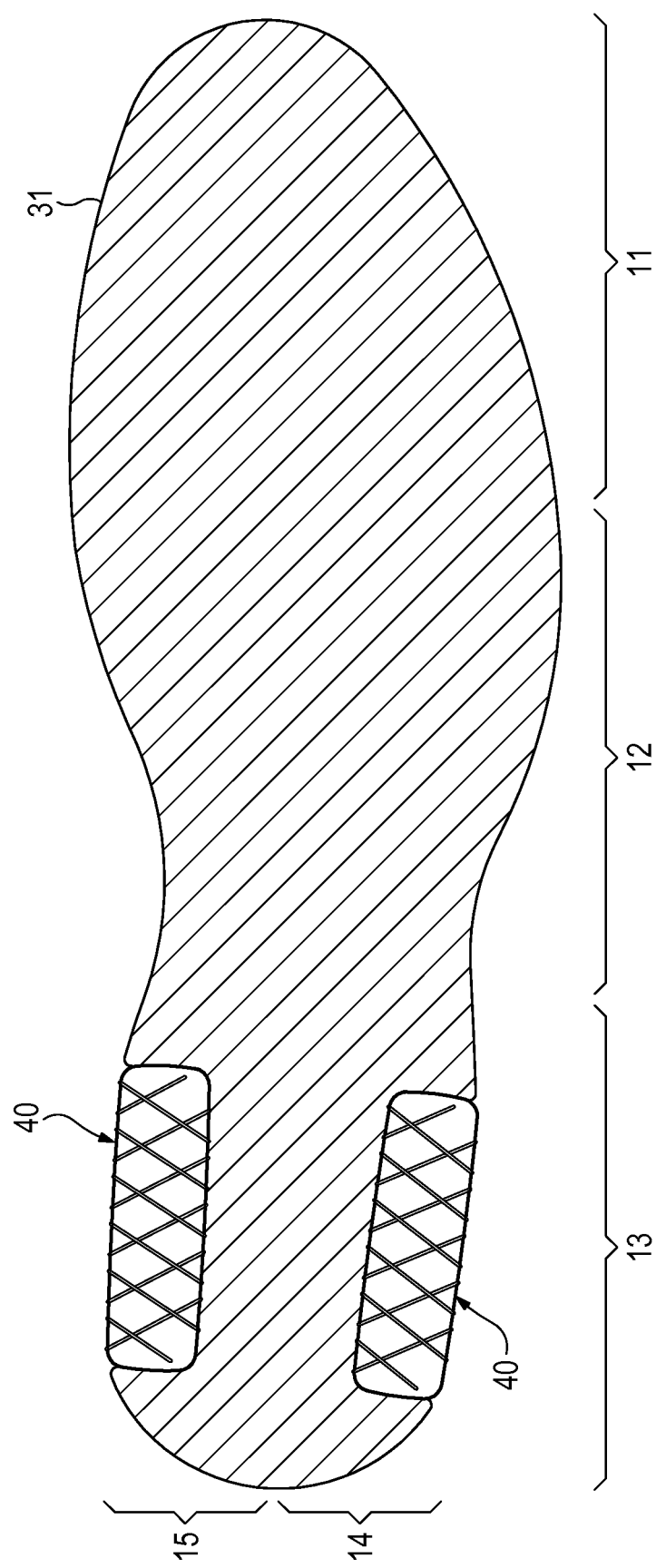

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality of material elements (e.g., textiles, foam, leather, and synthetic leather) that are stitched or adhesively bonded together to form an interior void for securely and comfortably receiving a foot. The various material elements may impart properties of air-permeability, compressibility, durability, flexibility, water-resistance, and wear-resistance, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry of the foot into and removal of the foot from the interior void. Lace 22 may extend through apertures in upper 20, and a tongue portion of upper 20 may extend between the interior void and lace 22. Given that various aspects of the present invention primarily relate to sole structure 30, upper 20 may exhibit the general configuration discussed above or the general configuration of practically any other conventional or non-conventional upper. Accordingly, the structure of upper 20 may vary significantly.

Sole structure 30 is secured to upper 20 and has a configuration that extends between upper 20 and the ground. The primary elements of sole structure 30 are a midsole 31 and an outsole 32. Midsole 31 may be formed from a polymer foam material, such as polyurethane or ethylvinylacetate, that encapsulates a pair of pressure chambers 40 that enhance the cushioning (i.e., ground reaction force attenuation) characteristics of sole structure 30. Midsole 31 may also incorporate one or more moderators, plates, or reinforcing structures, for example, that further enhance the cushioning characteristics of sole structure 30 or the performance properties of footwear 10. Outsole 32, which may be absent in some configurations of footwear 10, is secured to a lower surface of midsole 31 and may be formed from a rubber material that provides a durable and wear-resistant surface for engaging the ground. Outsole 32 may also be textured to enhance the traction (i.e., friction) properties between footwear 10 and the ground. In addition, sole structure 30 incorporates a sockliner 33 that is located within the void in upper 20 and adjacent a plantar (i.e., lower) surface of the foot to enhance the comfort of footwear 10.

Pressure chambers 40 are at least partially embedded within midsole 31 and are generally positioned below upper 20 and above outsole 32. Each of pressure chambers 40 is located in heel region 13 and on one of lateral side 14 and medial side 15. Moreover, portions of pressure chambers 40 may be exposed on each of lateral side 14 and medial side 15. In addition to enhancing the aesthetic properties of footwear 10, exposing pressure chambers 40 locates pressure chambers 40 at the periphery of midsole 31, which has an effect upon the cushioning characteristics and stability of sole structure 30. As described in greater detail below, the configurations, the quantity, and the locations of pressure chambers 40 may vary significantly within footwear 10.

Pressure Chamber Configuration

One of pressure chambers 40 is depicted individually in FIGS. 4-6B as including a bladder 41 and one or more strands 42. Bladder 41 has a generally hollow structure that encloses a pressurized fluid, and strands 42 extend around bladder 41. A material forming strands 42 may have greater tensile strength or greater stretch-resistance than a material forming bladder 41. An advantage of this configuration is that strands 42 may form a tensile restraining structure that limits the amount by which bladder 41 stretches, distends, or otherwise expands due to the pressurized fluid within bladder 41. That is, strands 42 may limit the expansion of bladder 41 when pressurized.

Bladder 41 is formed from a polymer material that provides a sealed outer barrier for enclosing the pressurized fluid. Although the shape of bladder 41 may vary significantly, bladder 41 is depicted as having an elongate and substantially cylindrical configuration that includes a first end region 51, a second end region 52, and a center region 53. The form and shape of bladder 41 suggest a longitudinal axis 54 essentially extending from first end region 51 to second end region 52 and passing through central region 53. Additionally, bladder 41 includes a peripheral bond 55 where polymer sheets or a parison are bonded to each other during a manufacturing process for bladder 41.

In some configurations, bladder 41 is formed such that longitudinal axis 54 follows an arbitrary three-dimensional contour. For example, longitudinal axis 54 may be formed to be curved, contoured, or tapered. Longitudinal axis 54 may also follow a contour substantially conforming to lateral side 14, medial side 15, a portion of a foot, or a shape desirable for a foot to rest upon or against in an article of footwear. Moreover, the contour may be desirable to provide arch support, for example, or to raise the heel of the foot in relation to the toes.

As with many pressure vessels and other structures that contain pressurized fluids, the elongate and cylindrical configuration of bladder 41 provides a suitable shape for enclosing the pressurized fluid within bladder 41. As such, many configurations of bladder 41 have an elongate shape in which a length of chamber 44 exceeds a diameter (or a width and a height) of chamber 44 by a factor of three or more.

In addition to overall variations in the shape of bladder 41, the configurations of end regions 51 and 52 may also vary to be rounded, blunt, or protruding. As examples, end regions 51 and 52 may be formed to exhibit a tapered configuration, or end regions 51 and 52 may be formed to bulge outward from center region 53 along longitudinal axis 54 even when bladder 41 is essentially unpressurized (i.e., inflated to the pressure or air surrounding pressure chamber 40). Alternatively, end regions 51 and 52 may be snub-nosed or blunt. That is, end regions 51 and 52 may be formed to be substantially planar and circular and to not appreciably bulge outward from center region 53 along longitudinal axis 54 when bladder 41 is essentially unpressurized.

A wide range of polymer materials that are suitable for containing fluids, particularly when pressurized, may be utilized to form bladder 41. In selecting a polymer material for bladder 41, engineering properties of the material (e.g., tensile strength, stretch properties, and fatigue characteristics) may be considered. Examples of polymer materials that may be suitable for bladder 41 include thermoplastic polyurethane, polyester, polyester polyurethane, and polyether polyurethane. Bladder 41 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. Another suitable material for bladder 41 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

A variety of fluids may be enclosed within bladder 41, including both gasses and liquids. In some configurations, gel materials may also be enclosed within bladder 41. With regard to gasses, bladder 41 may enclose air, nitrogen, octafluorapropane, or any of the gasses disclosed in U.S. Pat. No. 4,340,626 to Rudy, such as hexafluoroethane and sulfur hexafluoride. As an example, the fluid within bladder 41 may be pressurized between zero and seven hundred kilopascals (i.e., approximately one hundred one pounds per square inch) or more.

Figure 4:
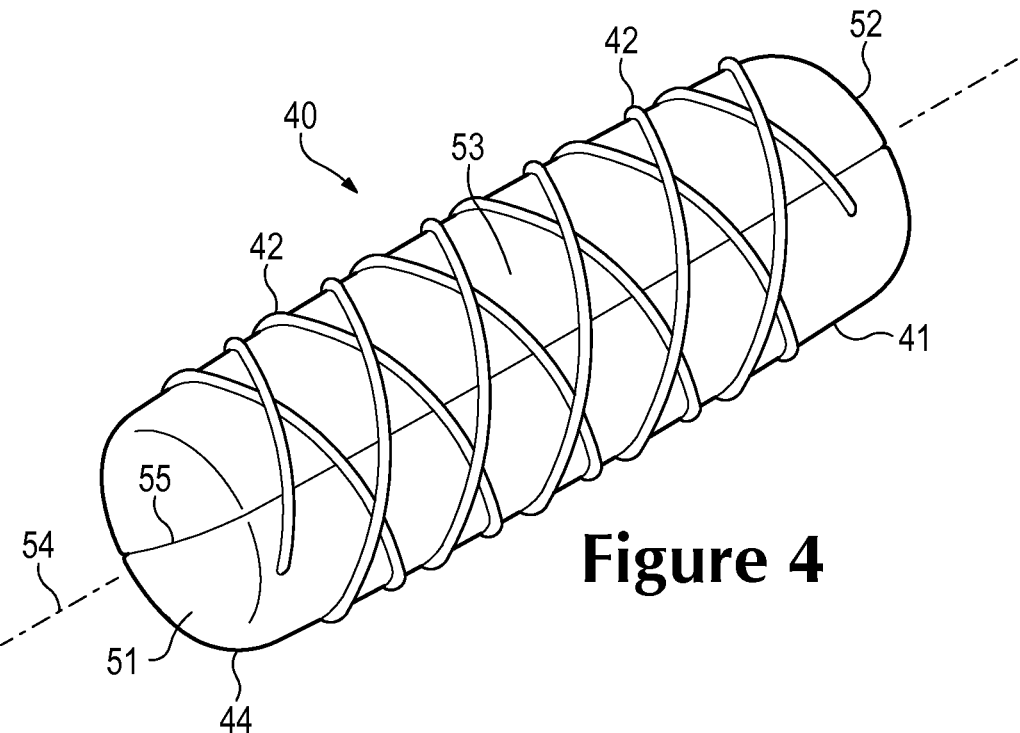
FIG. 4 is a perspective view of a pressure chamber from the article of footwear.
Figure 5:
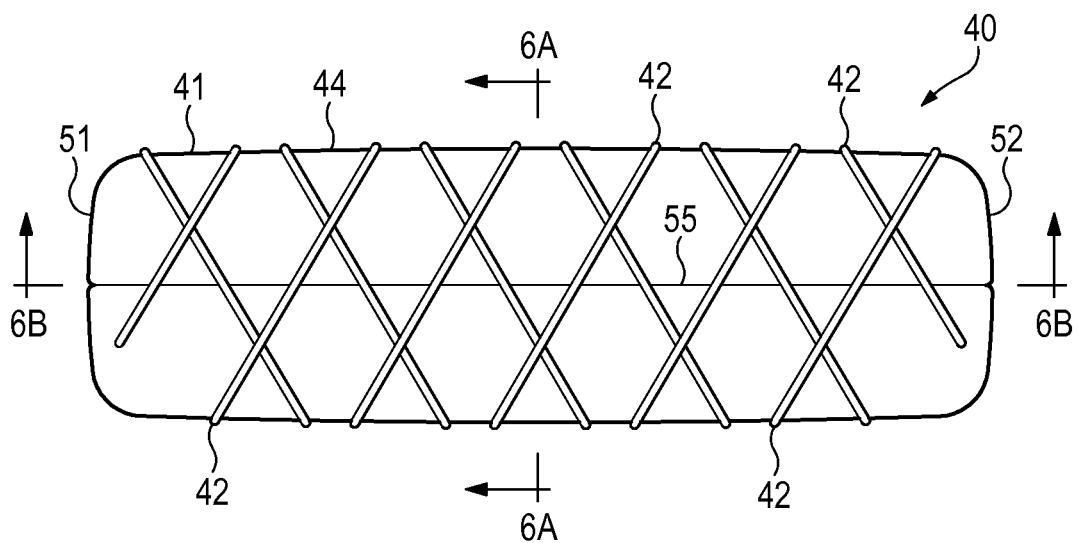
FIG. 5 is a top plan view of the pressure chamber.

Strand 42 extends around bladder 41 to form a tensile restraining structure that limits the expansion of bladder 41 when pressurized. As an example of the manner in which strand 42 may be wound around bladder 41, FIGS. 4 and 5 depict a configuration wherein four segments of strands 42 are wound around bladder 41, thereby forming a network of crossed strands 42 that extend over the outer surface of bladder 41. More particularly, the four segments of strand 42 are wound around bladder 41 in a helical configuration. That is, each segment of strands 42 extends around longitudinal axis 54 and along the length of longitudinal axis 54, thereby extending from first end region 51 to second end region 52. Moreover, two segments of strands 42 are wound around longitudinal axis 54 from first end region 51 to second end region 52 in a clockwise manner, and two other segments of strands 42 are wound around longitudinal axis 54 from first end region 51 to second end region 52 in a counter-clockwise manner. This configuration effectively forms a mesh or net structure that extends over bladder 41. As discussed in greater detail below, however, the manner in which strands 42 extend around bladder 41 may vary significantly.

Strands 42 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable configurations for strands 42 include various filaments, fibers, yarns, threads, and cables that are formed from one or more of rayon, nylon, polyester, polyacrylic, silk, cotton, carbon, glass, aramids (e.g., para-aramid fibers and meta-aramid fibers), ultra high molecular weight polyethylene, liquid crystal polymer, and various metals. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

An advantage of locating strands 42 around bladder 41 relates to the expansion of bladder 41 when pressurized. If strands 42 are not wound around bladder 41 when bladder 41 is pressurized, bladder 41 may stretch, distend, or otherwise expand outward in center region 53. In contrast, if strands 42 are wound around bladder 41 when bladder 41 is pressurized, the tension in strands 42 may allow bladder 41 to expand outward by a comparatively lesser amount. Accordingly, strands 42 form a tensile restraining structure that limits the expansion of bladder 41 when pressurized.

Although strands 42 may lie against an outer surface of bladder 41, strands 42 are generally secured to bladder 41. Although adhesives or other methods of securing may be used, a polymer bond may secure bladder 41 and strands 42 to each other. As utilized herein, the term "polymer bond" or variants thereof is defined as a securing technique between bladder 41 and strands 42 that involves a softening or melting of a polymer material within at least one of bladder 41 and strands 42 such that bladder 41 and strands 42 are secured to each other when cooled. As examples, polymer bonding may involve (a) the melting or softening of polymer materials within each of bladder 41 and strands 42 such that the polymer materials intermingle with each other (e.g., diffuse across a boundary layer between the polymer materials) and are secured together when cooled; (b) the melting or softening of a polymer material within bladder 41 such that the polymer material extends into or infiltrates the structure of strands 42 (e.g., extends around or bonds with filaments or fibers in strands 42) to secure bladder 41 and strands 42 together when cooled; and (c) the melting or softening of a polymer material within one of bladder 41 and strands 42 such that the polymer material extends into or infiltrates crevices or cavities to secure the elements together when cooled.

Polymer bonding may occur when only one element of pressure chamber 40 (i.e., one of bladder 41 or strands 42) includes a polymer material or when both elements of pressure chamber 40 (i.e., both bladder 41 and strands 42) include polymer materials. Additionally, polymer bonding does not generally involve the use of adhesives or other securing methods or devices, but involves directly bonding elements to each other with heat or a combination of heat and pressure. In some situations, however, adhesives or other securing methods or devices may be utilized to supplement the polymer bond or the joining of elements through polymer bonding.

In configurations where bladder 41 and strands 42 include the same polymer material, the polymer bond may include the commingling and merging of the commonly-shared polymer material of bladder 41 and the commonly-shared polymer material of strands 42 to form a substantially continuous combined structure. Where bladder 41 and strands 42 include different polymer materials, the polymer bond may include one of either a polymer material of bladder 41 or a polymer material of strands 42 substantially conforming at the microscopic level to the specific structure of the other polymer, including microscopic imperfections such as pits and protrusions in the other polymer's surface. Polymer bonding may also include a polymer material of bladder 41 extending around filaments or fibers that form strands 42, thereby substantially surrounding individual elements within strands 42. For example, the polymer material of bladder 41 may substantially surround the filaments or fibers that form strands 42 at one or more places where bladder 41 and strands 42 make contact.

Based upon the above discussion, pressure chamber 40 is formed from both bladder 41 and strands 42. Bladder 41 is at least partially formed from a polymer material that encloses a pressurized fluid, and strand 42 is wound around the bladder and secured to the bladder. In this configuration, strands 42 form a tensile restraining structure that limits the amount by which bladder 41 stretches, distends, or otherwise expands due to the pressurized fluid within bladder 41. Although the configuration disclosed above provides a suitable configuration for pressure chamber 40, a variety of other configurations are described below in order to illustrate some potential variations for pressure chamber 40.

Further Pressure Chamber Configurations

Aspects of bladder 41 and strand 42 may vary significantly, depending upon the desired properties of pressure chamber 40 or the intended use for pressure chamber 40. Moreover, changes to the dimensions, shapes, and materials utilized within bladder 41 and strand 42 may vary the overall properties of pressure chamber 40. That is, by changing the dimensions, shapes, and materials utilized within bladder 41 and strand 42, the compressibility, impact force attenuation, flexibility, and overall mass of pressure chamber 40 may be tailored to specific purposes or types of footwear or other products. A plurality of variations for pressure chamber 40 are discussed below. Any of these variations, as well as combinations of these variations, may be utilized to tailor the properties of pressure chamber 40 to an intended use or particular product.

The configuration of pressure chamber 40 disclosed above provides an example of the manner in which bladder 41 may be configured and strands 42 may be arranged. As a comparison, FIG. 7A discloses a configuration of pressure chamber 40 wherein strands 42 are positioned closer together than in FIGS. 3-6B. Similarly, FIG. 7B discloses a configuration wherein strands 42 are positioned further apart. Depending upon the pressure of the fluid within bladder 41, the specific material utilized for bladder 41, the thickness of the material forming bladder 41, and the application in which pressure chamber 40 may be utilized, for example, the spacing of strands 42 may vary to restrain the expansion of bladder 41.

Figure 7A:
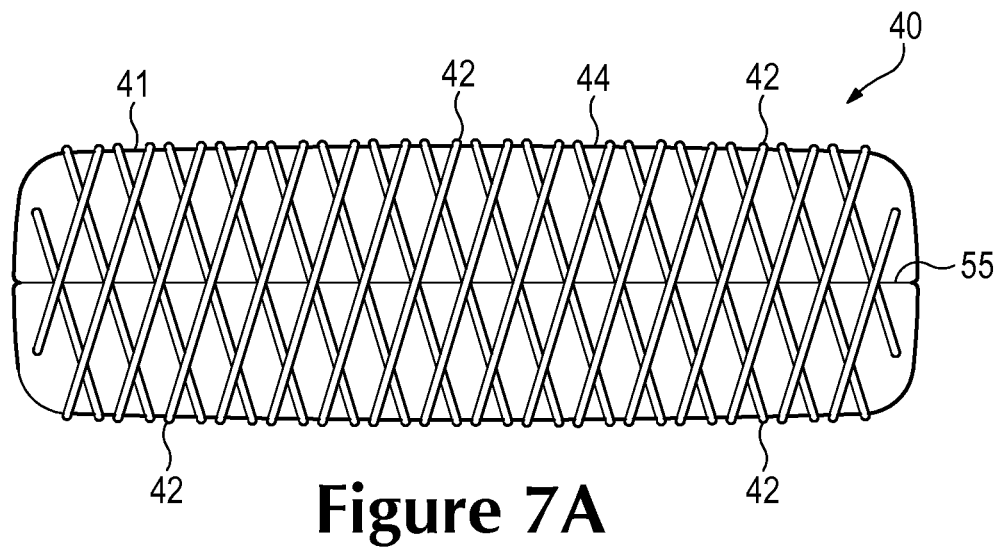
FIGS. 7A-7O are top plan views corresponding with FIG. 5 and depicting further configurations of the pressure chamber.
Figure 7B:
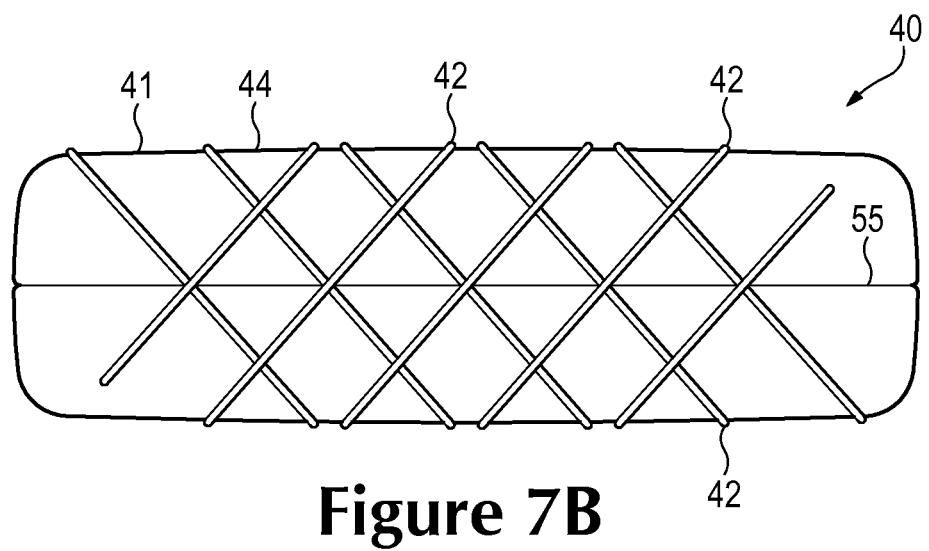
Figure 7C:
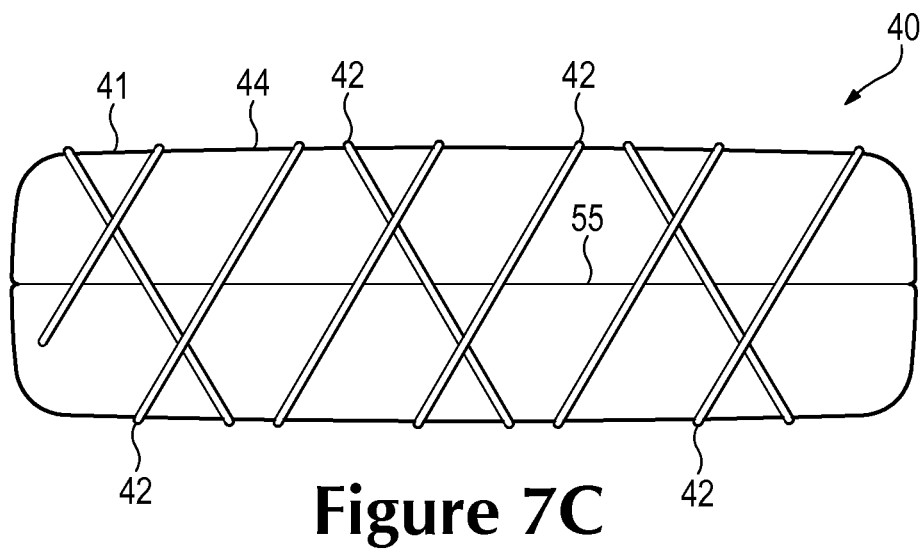
Figure 7D:
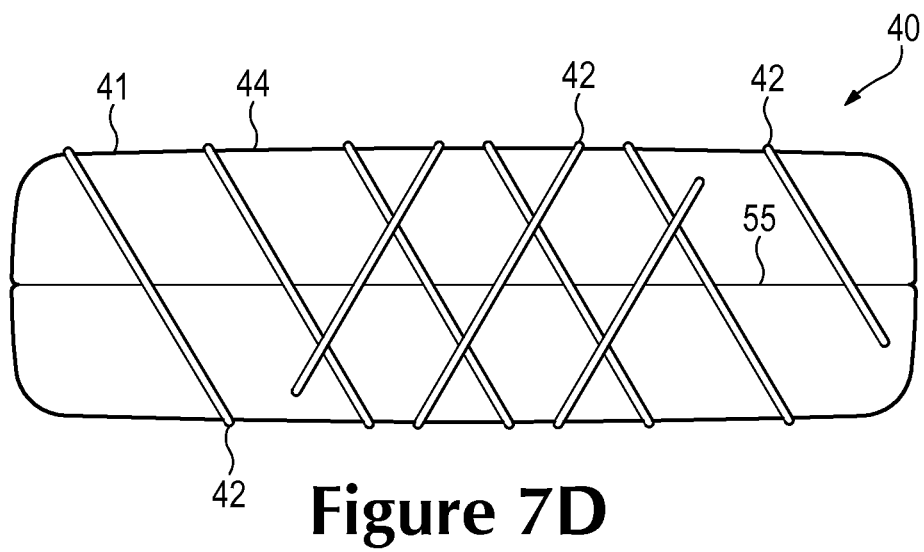
Figure 7E:
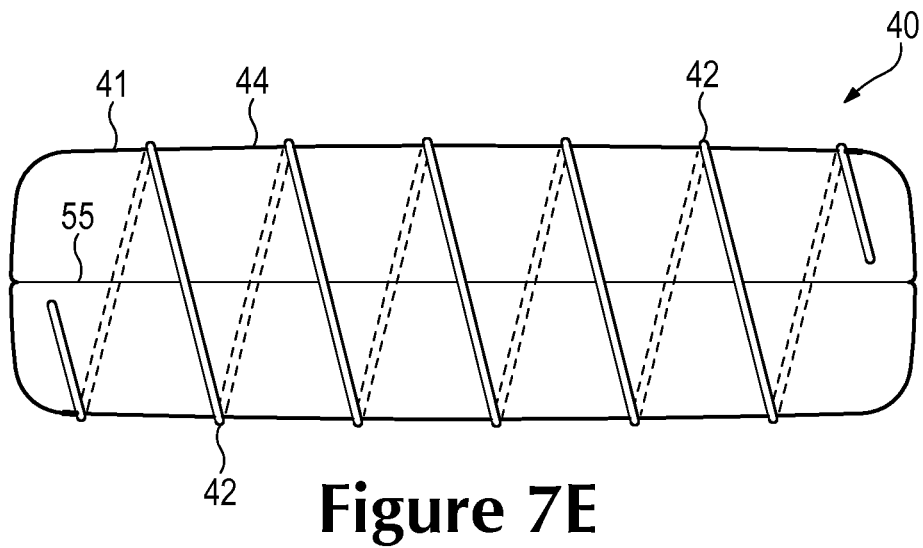
Figure 7F:
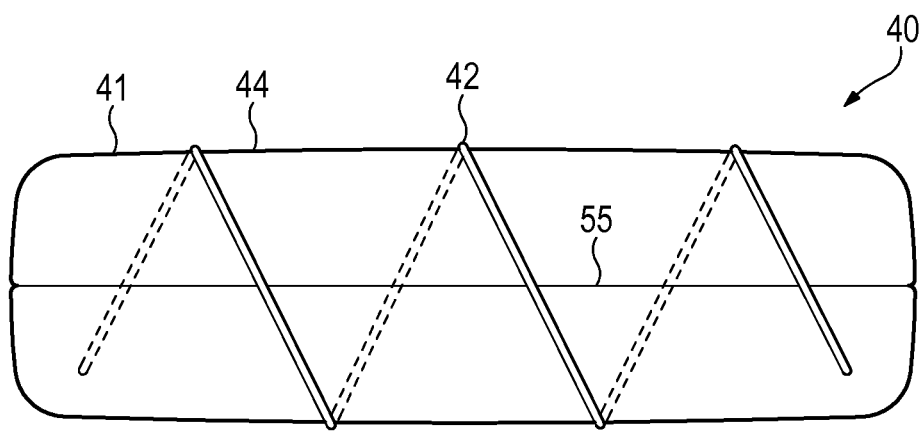
Figure 7G:
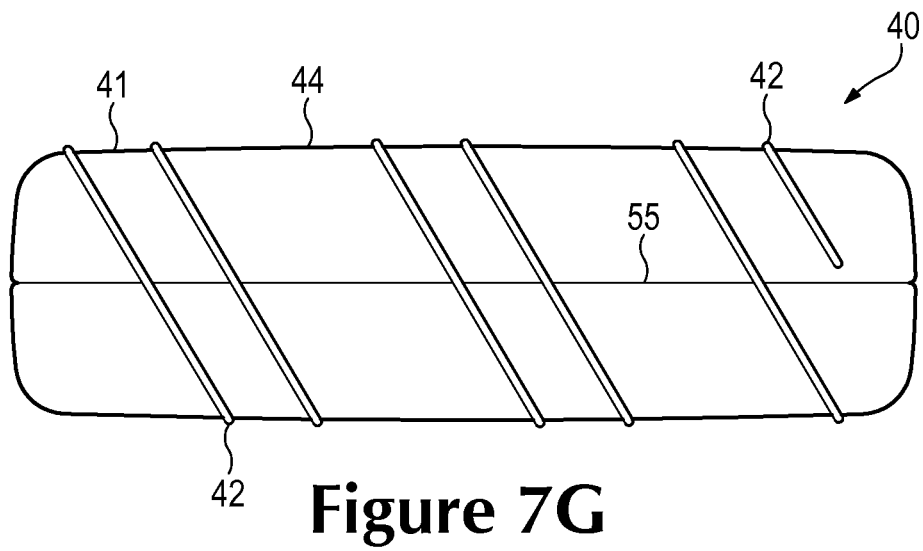

A variety of other configurations for strands 42 may also restrain the expansion of bladder 41. Referring to FIG. 7C, a majority of strands 42 are oriented to extend around bladder 41 in one direction, whereas a lesser number of strands 42 extend around bladder 41 in an opposite direction. The strands 42 extending around bladder 41 in the opposite direction may also be limited to one area of bladder 41, as depicted in FIG. 7D. Although strands 42 may extend around bladder 41 in both a clockwise and counter-clockwise direction, a single strand 42 may extend around bladder 41 in a single direction, as depicted in FIG. 7E. As with other configurations, the spacing of the single strand 42 may vary, as depicted in FIG. 7F. Additionally, two strands 42 may extend around bladder 41 in a common direction, as depicted in FIG. 7G.

Figure 7H:
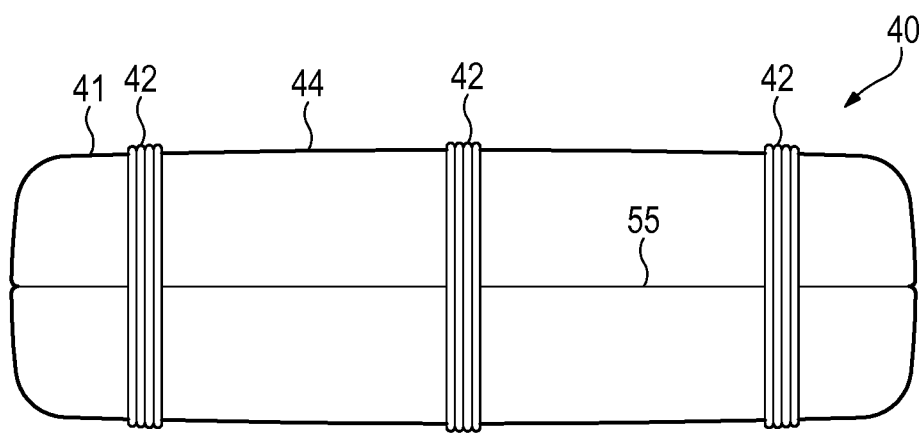
Figure 7I:
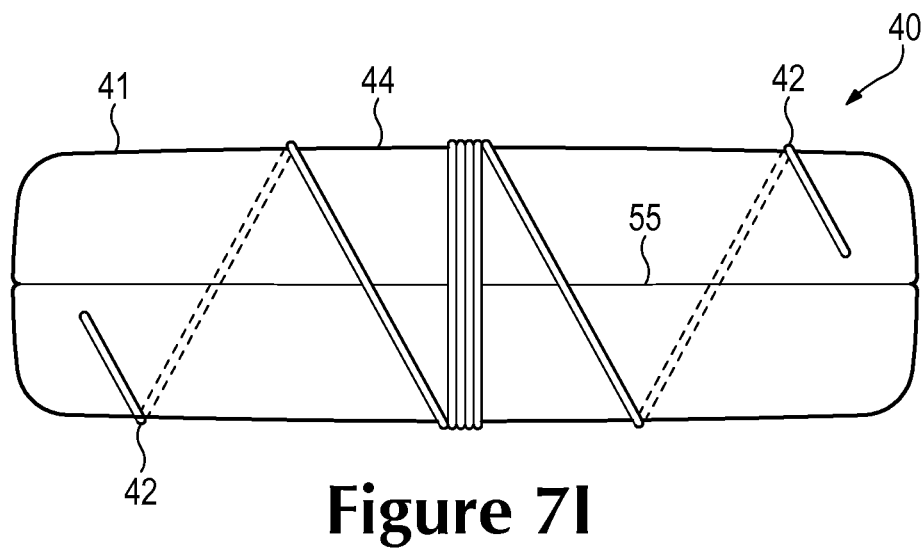

In the configurations disclosed above, strands 42 extend around bladder 41 in a generally helical configuration, thereby extending about the length of longitudinal axis 54. Referring to FIG. 7H, strands 42 extend around limited areas of bladder 41, thereby extending about a relatively small portion of longitudinal axis 54 or one point along longitudinal axis 54. In order to cover other areas of bladder 41, one or more of strands 42 may also exhibit the generally helical configuration, as depicted in FIG. 7I.

Figure 7J:
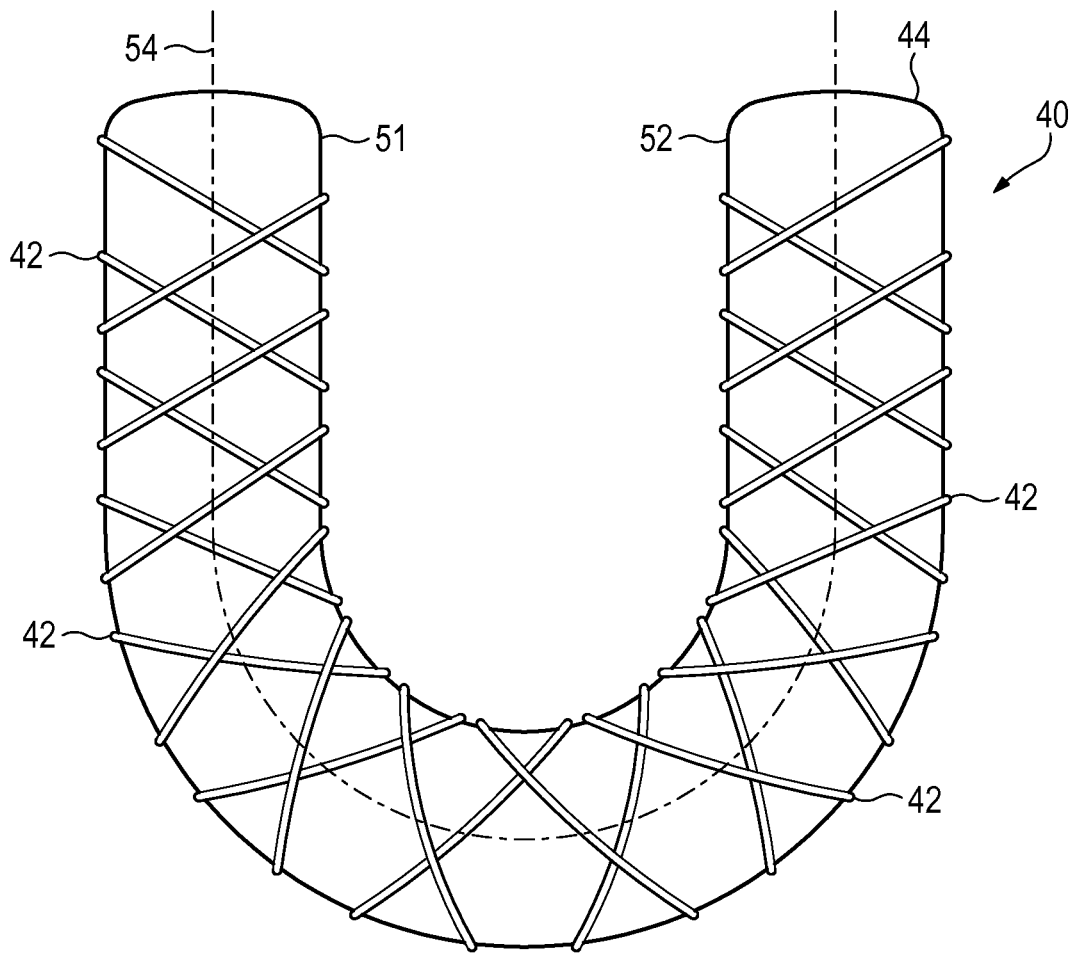
Figure 7K:
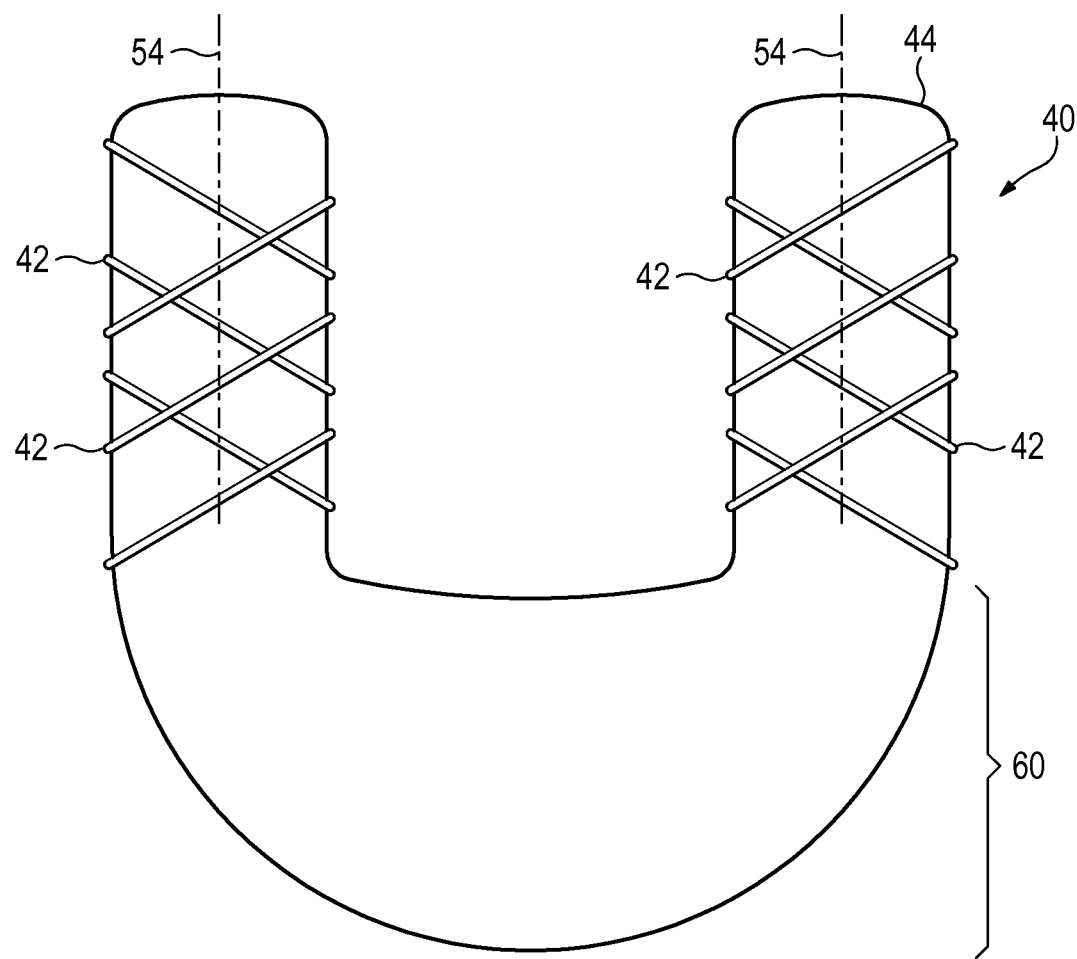
Figure 7L:
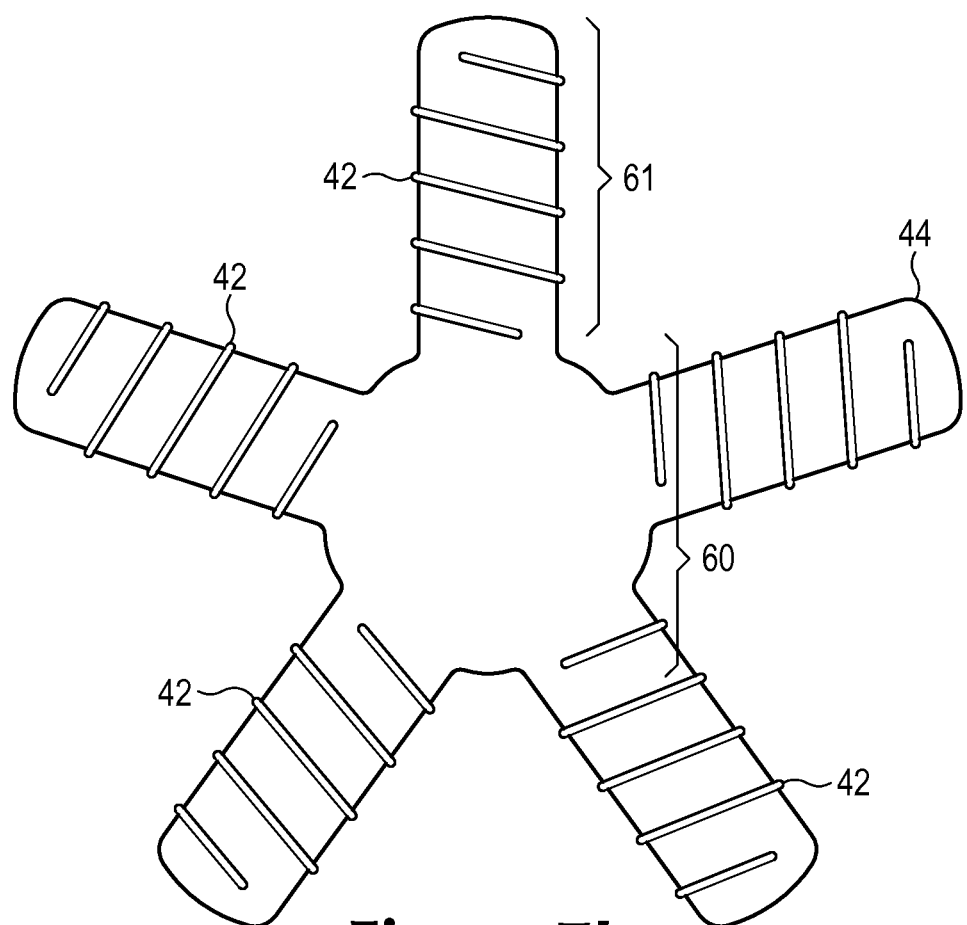

Pressure chamber 40 may have the generally straight or linear configuration disclosed above. In further configurations, however, pressure chamber 40 bladder 41 may be curved or contoured. Referring to FIG. 7J, pressure chamber 40 has a generally U-shaped structure that may, for example, be usable within heel region 13 of footwear 10. More particularly, one side of pressure chamber 40 may extend along lateral side 14, the opposite side of pressure chamber 40 may extend along medial side 15, and the curved portion may extend around a back of heel region 13. In further configurations, pressure chamber 40 may have a C-shaped or V-shaped configuration, or pressure chamber 40 may exhibit undulating N-shaped, M-shaped, or S-shaped configurations. Although all of pressure chamber 40 or bladder 41 may have an elongate configuration, portions of bladder 41 may also exhibit other configurations. Referring to FIG. 7K, for example, a central area 60 of pressure chamber 40 may have increased thickness. Additionally, FIG. 7L discloses a configuration wherein strands 42 extend around various lobes of bladder 41 that extend outward from a central area 60.

Figure 7M:
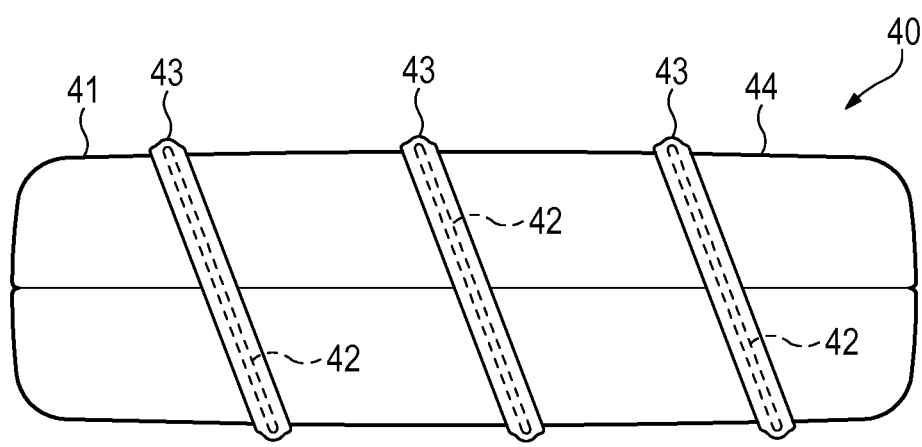
Figure 7N:
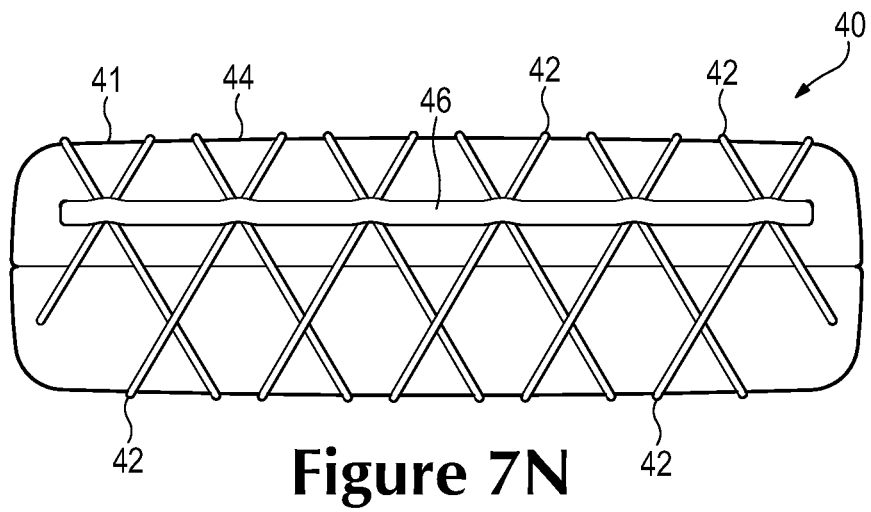

Polymer bonds may be solely utilized to secure strands 42 to bladder 41. In other configurations, other techniques or devices may be utilized to strands 42 to bladder 41, or a combination of polymer bonds and the other techniques or devices may be utilized to secure strands 42 to bladder 41. Referring to FIG. 7M, strands 42 may be secured to bladder 41 with a cover layer 43 that extends over strands 42. As an example, cover layer 43 may be a layer of polymer that bonds with bladder 41, thereby trapping strands 42 between bladder 41 and cover layer 43. Cover layer may also extend across multiple segments of strands 42, as depicted in FIG. 7N. In addition to securing strands 42 to bladder 41, cover layer 43 may also protect strands 42.

Figure 7O:
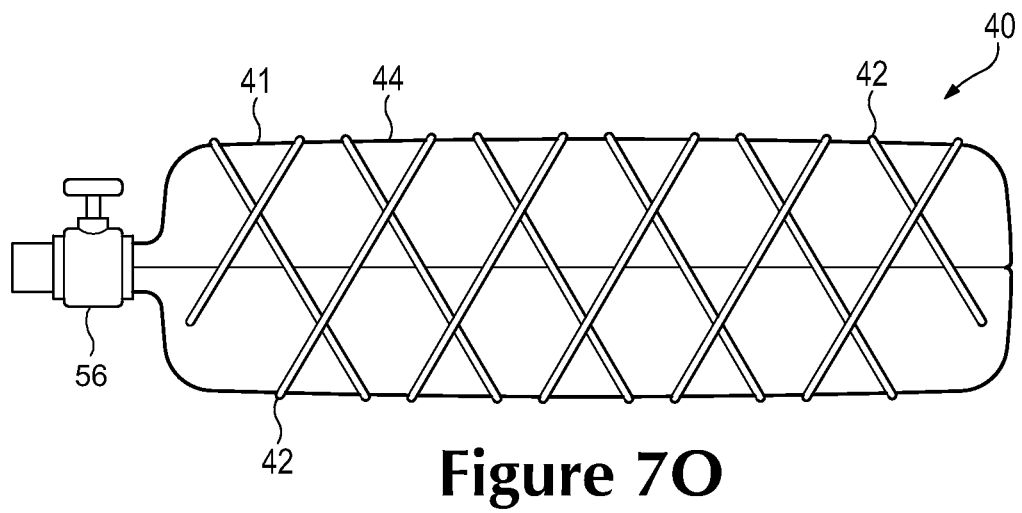

Bladder 41 is generally sealed to enclose the pressurized fluid within pressure chamber 40. In some configurations, as depicted in FIG. 7O, a valve 56 may be coupled with bladder 41 to allow the pressure of the fluid within chamber 41 to be varied. An advantage of this configuration is that the pressure of the fluid within each of pressure chambers 40 may be adjusted to the preferences, weight, or running style of an individual wearing footwear 10.

Figure 6A:
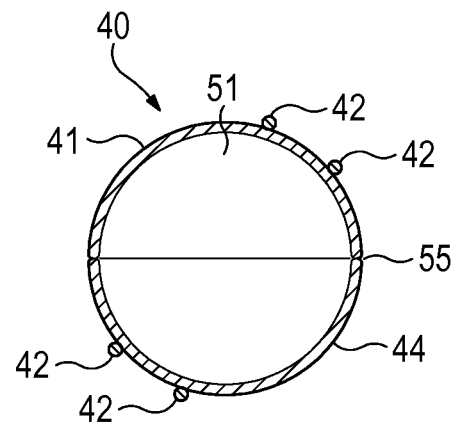
FIGS. 6A and 6B are cross-sectional views of the pressure chamber, as respectively defined by section lines 6A and 6B in FIG. 5.
Figure 6B:
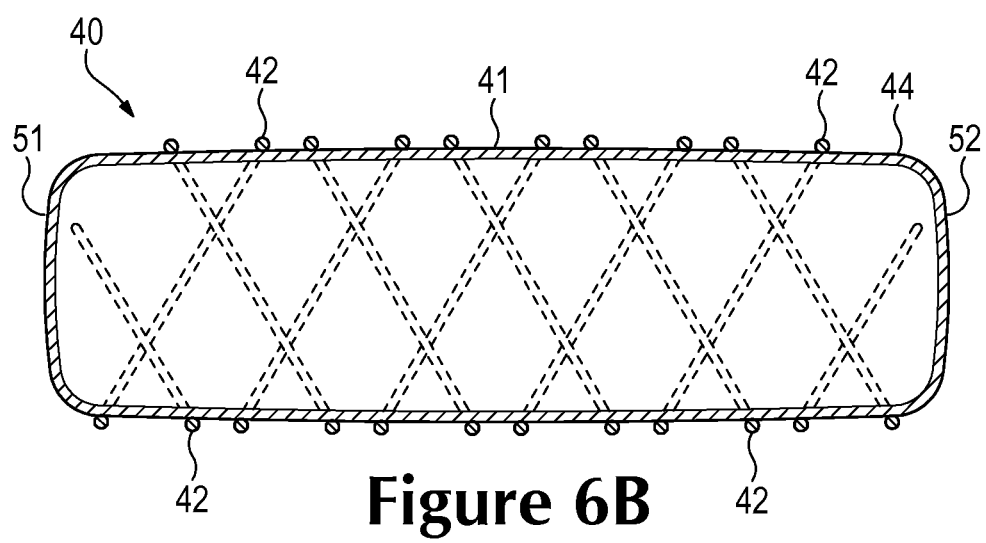
Figure 8A:
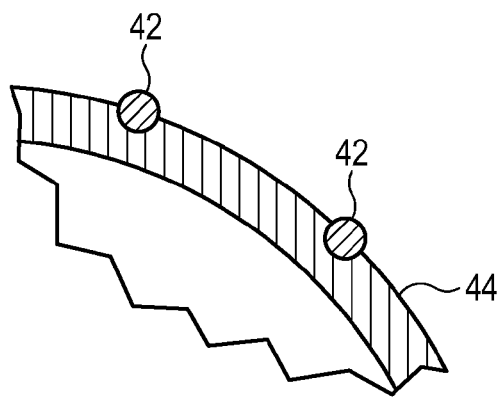
FIGS. 8A-8D are cross-sectional views corresponding with a portion of FIG. 6A and depicting further configurations of the pressure chamber.
Figure 8B:
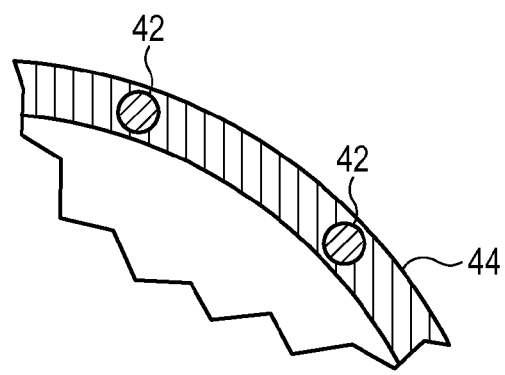
Figure 8C:
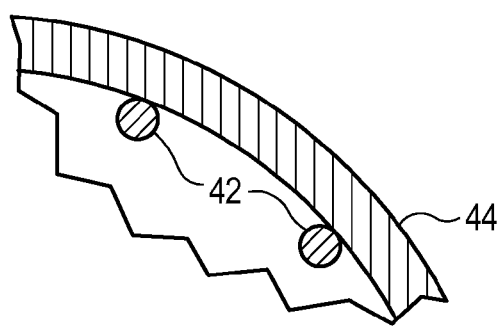
Figure 8D:
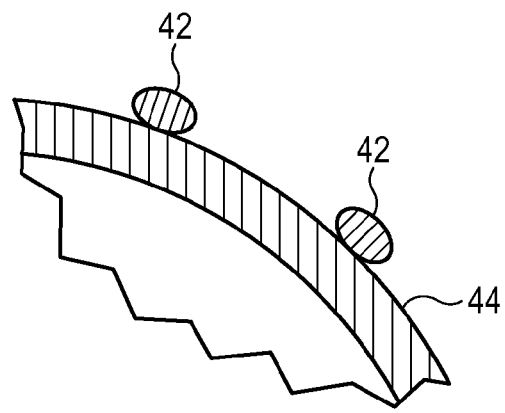

The position of strands 42 relative to the outer surface of bladder 41 may vary significantly. Referring to FIGS. 6A and 6B, strands 42 are positioned to lie against the outer surface of bladder 41 when secured with the polymer bond. As noted above, polymer bonding may involve directly bonding elements to each other with heat or a combination of heat and pressure. Given that portions of bladder 41 may melt or soften as a result of the heat, strands 42 may become partially recessed into the outer surface of bladder 41, as depicted in FIG. 8A, or strands 42 may be fully recessed into bladder 41, as depicted in FIG. 8B. Strands 42 may also be positioned adjacent to an interior surface of bladder 41, as depicted in FIG. 8C, or strands may have non-circular configurations, as depicted in FIG. 8D.

Figure 9A:
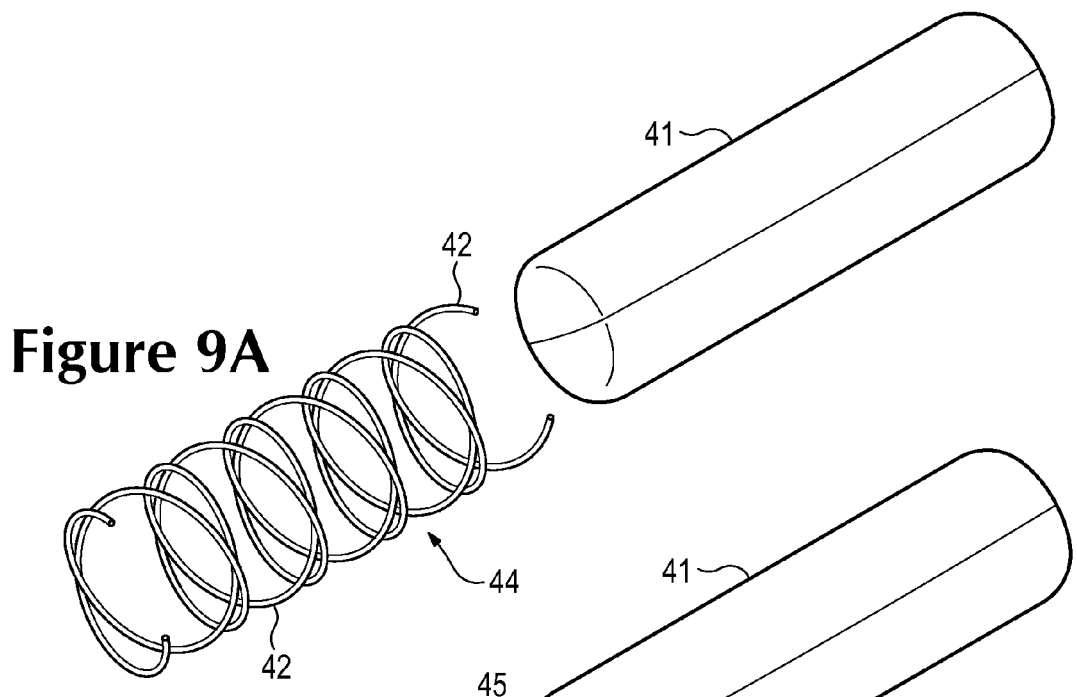
FIGS. 9A-9C are exploded perspective views depicting further configurations of the pressure chamber.
Figure 9B:
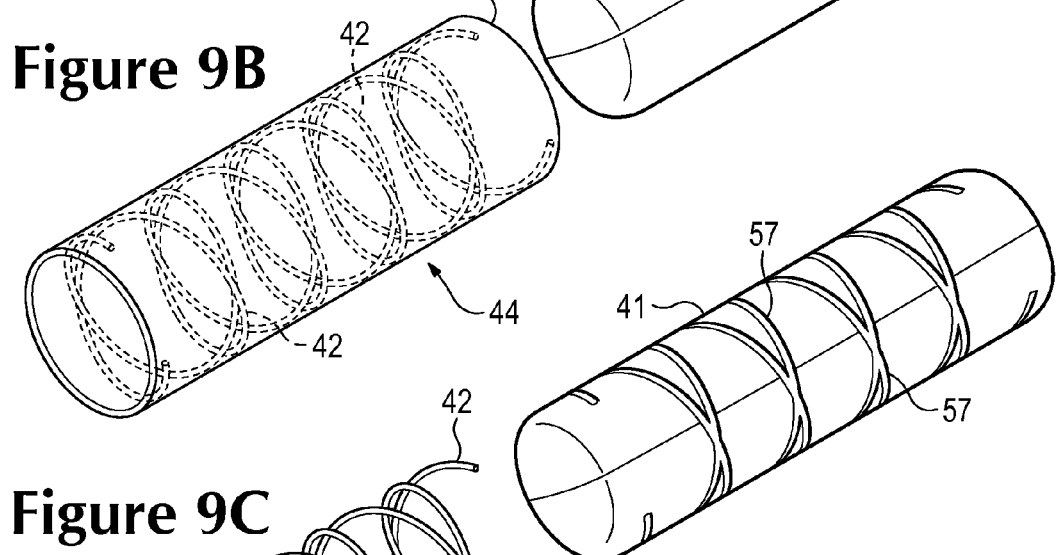
Figure 9C:
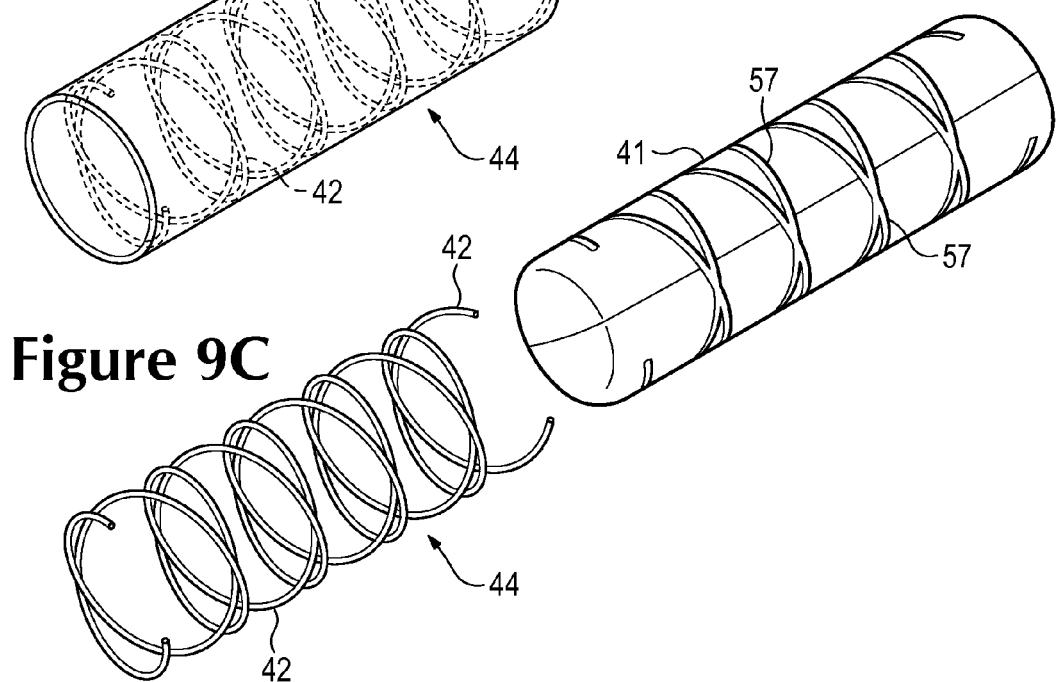

With reference to FIG. 9A, strands 42 may be secured to or bonded to each other and may form a sheath 44 surrounding bladder 41. With reference to FIG. 9B, in other configurations, strands 42 may be embedded in a separate sheet or tube (e.g., a textile) 45 encasing bladder 41, which may include a polymer material and may form a polymer bond with bladder 41, strands 42, or both. With reference to FIG. 9C, strands 42 may be positioned within indentations 57 in the outer surface of bladder 41, which may guide strands 42 into a desired configuration on the outer surface of bladder 41.

As depicted in FIGS. 1-6B, strands 42 are generally secured to bladder 41. However, in other configurations, strands 42 may be unsecured to bladder 41. For example, strands 42 may lie against a surface of bladder 41 in a manner that permits adjustment of a degree of tension applied to strands 42, for example by a tightening of strands 42 about bladder 41. Furthermore, in some configurations, a sheath substantially surrounding some portion or portions of strands 42 and may be secured (such as by a polymer bond) to bladder 41. Strands 42 may in turn be unsecured to such sheaths, and may freely move within them, thereby facilitating the tightening of strands 42 about bladder 41. In some configurations, footwear lacing systems similar to those disclosed in U.S. Pat. Nos. 6,289,558 and 7,591,050 to Hammerslag may be adapted to tighten strands 42 about bladder 41.

Figure 10:
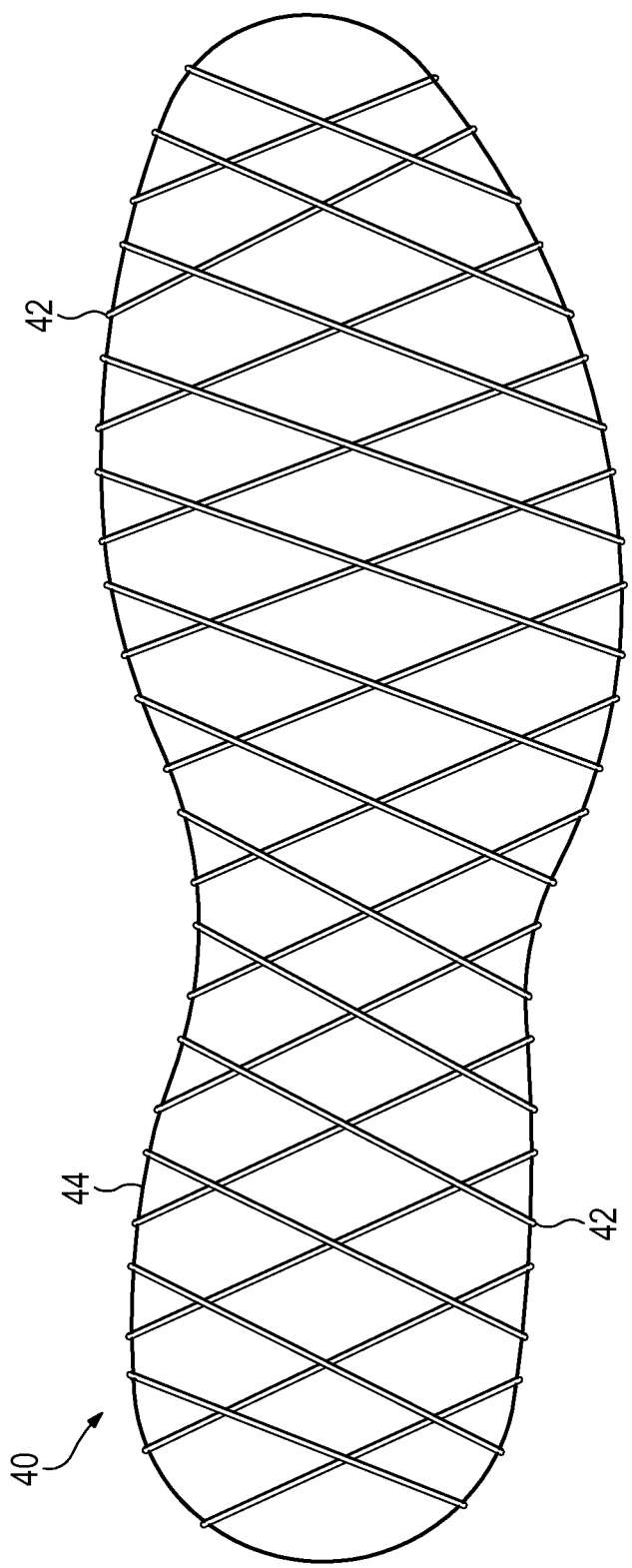
FIG. 10 is a top plan view of another configuration of the pressure chamber.
Figure 11:
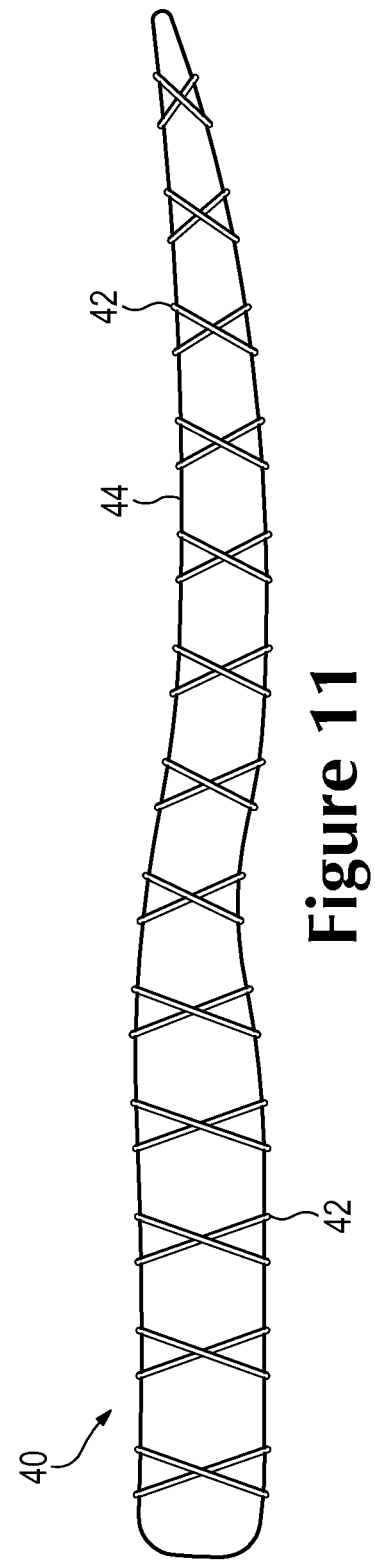
FIG. 11 is a side elevational view of the pressure chamber depicted in FIG. 10.

A configuration of pressure chamber 40 that has a general shape of a foot is disclosed in FIGS. 10 and 11. When incorporated into footwear 10, for example, this configuration of pressure chamber 40 may extend under substantially all of the foot. Although pressure chamber 40 may be located within midsole 31, this configuration of pressure chamber 40 may also be used as a sockliner within upper 20. In order to form relatively flat upper and lower surfaces, pressure chamber 40 may incorporate a tensile member, as disclosed in U.S. Pat. No. 6,837,951 to Rapaport, which is incorporated herein by reference. Although the tensile member forms relatively flat upper and lower surfaces, the tensile member is generally unsecured to a periphery or sidewall area, which may expand at relatively high fluid pressures. Accordingly, strands 42 may extend around bladder 41 to prevent expansion of the periphery or sidewall area. A similar configuration is depicted in FIGS. 12 and 13, wherein strands 42 are present in the periphery or sidewall area, but are absent from portions of the upper and lower surfaces.

Further Footwear Configurations

The configuration of pressure footwear 10 disclosed above provides an example of the manner in which pressure chamber 40 may be incorporated into midsole 31. In some configurations of footwear 10, pressure chamber 40 may have an upper portion facing upper 20, a lower portion facing outsole 32, and sidewall surfaces between the upper and lower portions. In such configurations, a gap at a side surface of sole structure 30 may expose a portion of the sidewall surfaces of pressure chamber 40 including portions or segments of strands 42 wound around pressure chamber 40, and the exposed portions or segments of strands 42 may extend from the upper portion of pressure chamber 40 to the lower portion of pressure chamber 40 and may be secured to the sidewall portion of pressure chamber 40. Alternatively, a gap in a different outer surface of sole structure 30 may expose other portions of pressure chamber 40 and other segments of strands 42. For example, a gap in an upper surface or a lower surface of sole structure 30 may expose a part of the upper portion of pressure chamber 40 or a part of the lower portion of pressure chamber 40, including portions or segments of strands 42 wound around pressure chamber 40.

Figure 14:
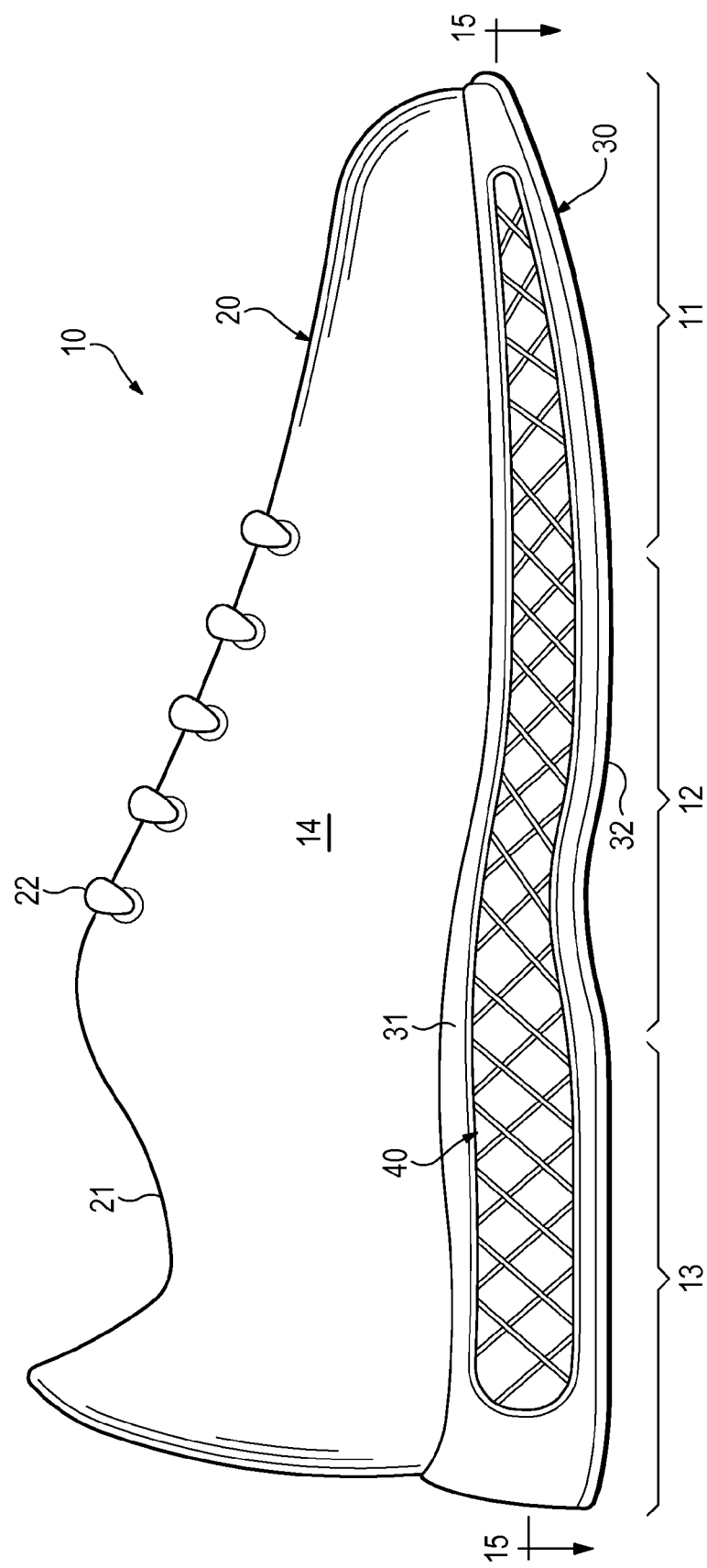
FIG. 14 is a side elevational view of another configuration of the article of footwear.
Figure 15:
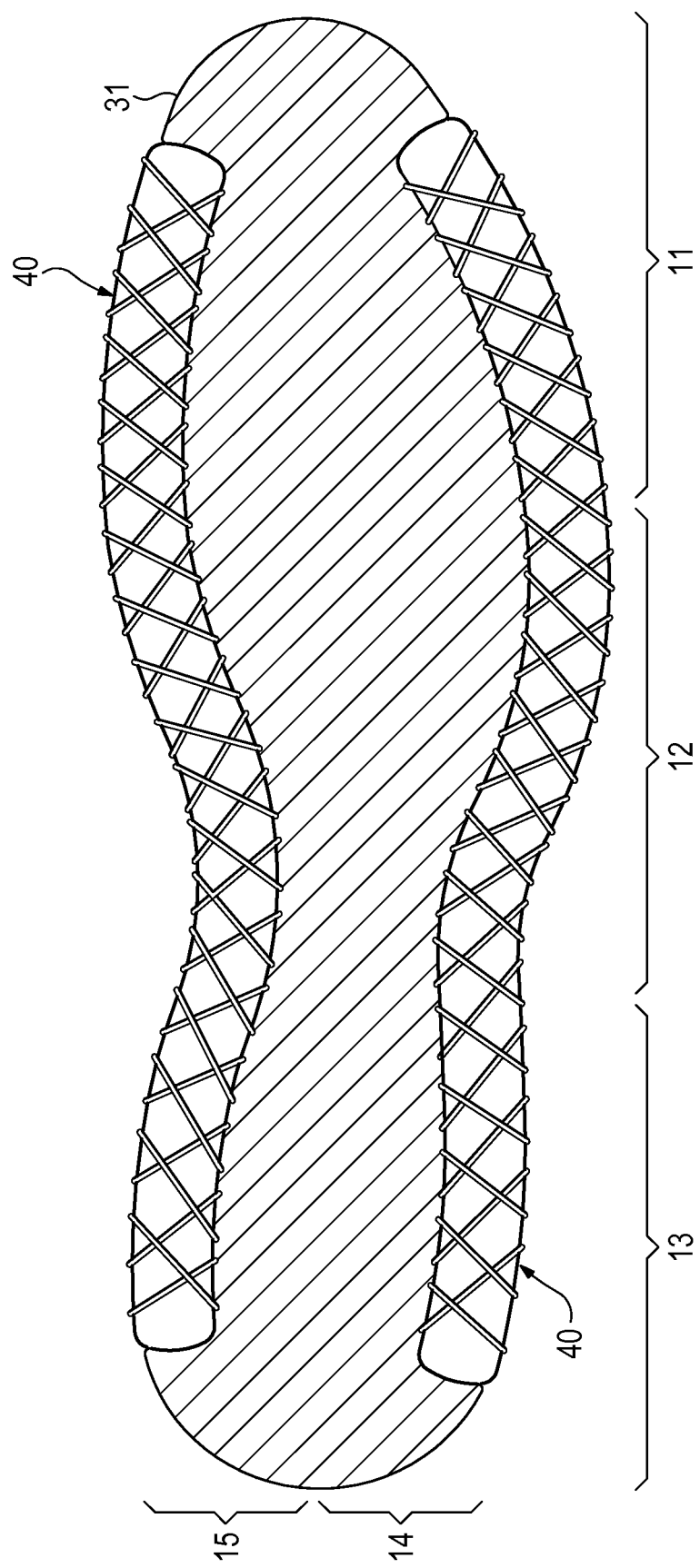
FIG. 15 is a cross-sectional view of the article of footwear, as defined by section line 15 in FIG. 14.
Figure 16:
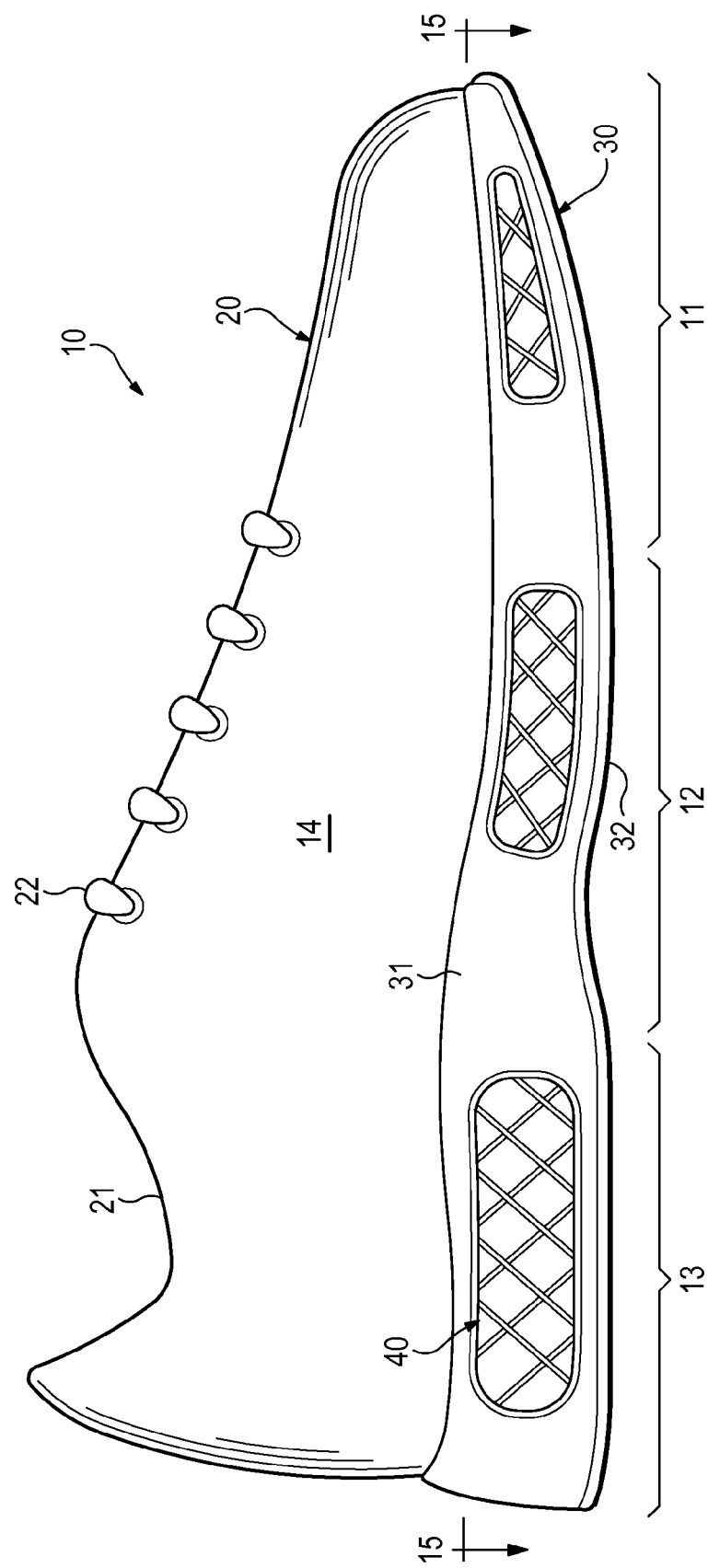
FIG. 16 is a side elevational view of yet another configuration of the article of footwear.
Figure 17:
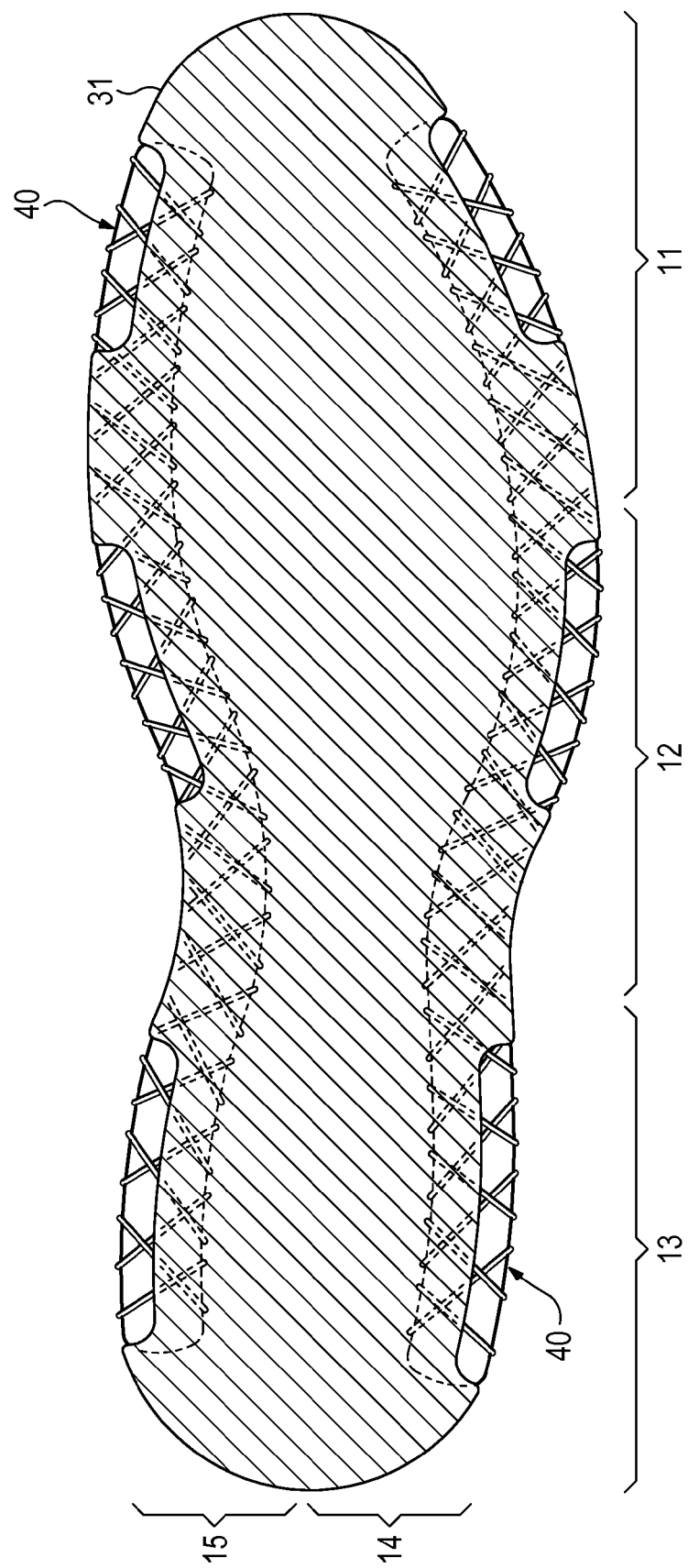
FIG. 17 is a cross-sectional view of the article of footwear, as defined by section line 17 in FIG. 16.

In the configuration of footwear 10 disclosed above, a gap at a side surface of sole structure 30 exposes portions of pressure chamber 40 in heel region 13 of midsole 31. In configurations where pressure chamber 40 extends from forefoot region 11 to heel region 13, as depicted in FIGS. 14 and 15, a gap at the side surface of sole structure 30 may expose substantially all of the length of pressure chamber 40. However, in other configurations, a plurality of gaps in a side surface of sole structure 30 may expose pressure chamber 40. In addition, where pressure chamber 40 extends from heel region 13 to midfoot region 12 or forefoot region 11, one or more gaps at a side surface of sole structure 30 may expose pressure chamber 40 along any portion of midsole 31. For example, with reference to FIGS. 16 and 17, pressure chamber 40 may extend through heel region 13, midfoot region 12, and forefoot region 11 of midsole 31, and one or more gaps may expose pressure chamber 40 along any portion or portions of the length of midsole 31, including a full length of midsole 31. However, in other configurations, the side surfaces of sole structure 30 may have no gaps exposing pressure chamber 40.

Returning to FIGS. 1-3B, lateral side 14 of midsole 31 includes a lateral-side pressure chamber 40, and medial side 15 of midsole 31 includes a medial-side pressure chamber 40. In other configurations, a single elongate U-shaped pressure chamber 40, as disclosed in FIGS. 7J and 7K, may be located on both lateral side 14 and medial side 15 of midsole 31. In such configurations, the U-shaped pressure chamber 40 may extend through heel region 13 on each of lateral side 14 and medial side 15, and may extend at least into midfoot region 12, or through midfoot region 12 and into forefoot region 11, on lateral side 14 of midsole 31, medial side 15 of midsole 31, or both.

Additionally, pressure chambers similar to pressure chamber 40 may be incorporated into products other than articles of footwear. Equipment frame elements similar to pressure chamber 40 may be incorporated into sporting equipment, such as various bats (e.g., baseball, softball, or cricket bats), clubs (e.g., golf clubs), mallets (e.g., polo mallets), racquets (e.g., tennis or squash racquets), and sticks (e.g., hockey or lacrosse sticks). Padding elements similar to pressure chamber 40 may be incorporated into padding or safety equipment, such as padded equipment used in sporting uniforms (e.g., baseball, football, or hockey uniforms) and apparel worn for safety purposes (e.g., boots, harnesses, or suits). Comfort-providing elements similar to pressure chamber 40 may be incorporated into parts of bags and body-supporting articles, such as carrying straps (e.g., golf bag or backpack straps), seat cushions, and mats (e.g., mattresses or yoga mats).

Manufacturing Methods

Figure 18A:
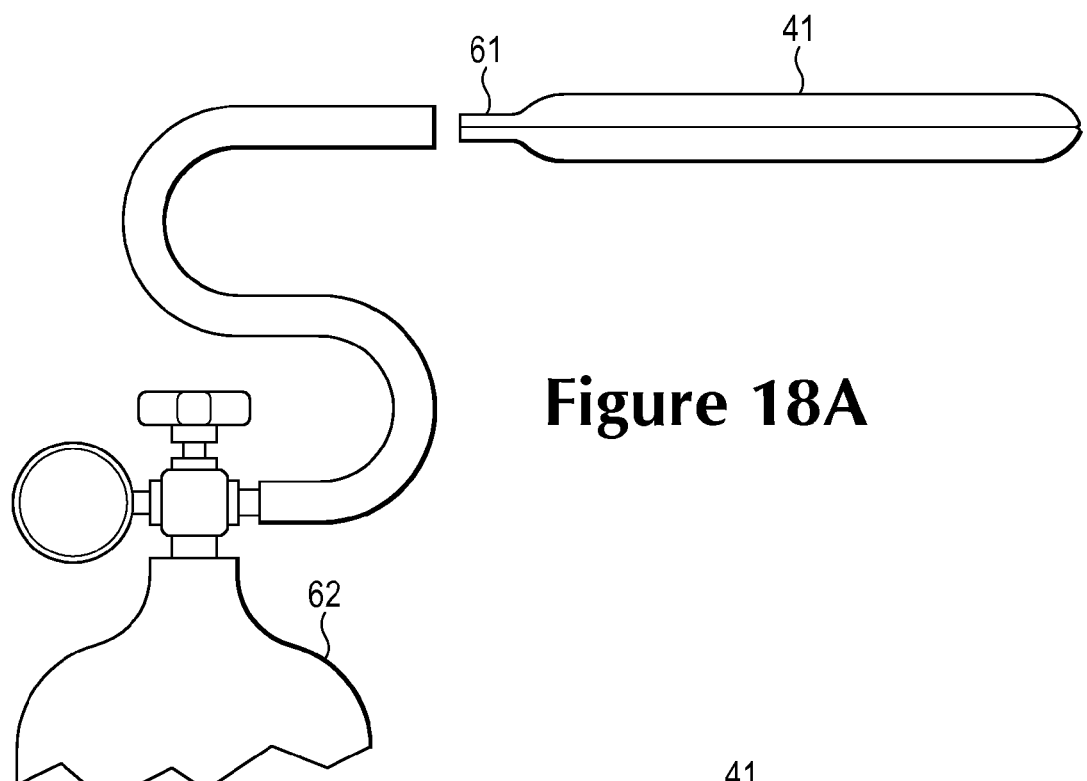
FIGS. 18A-18F are schematic side elevational views of a process for manufacturing the pressure chamber.
Figure 18B:
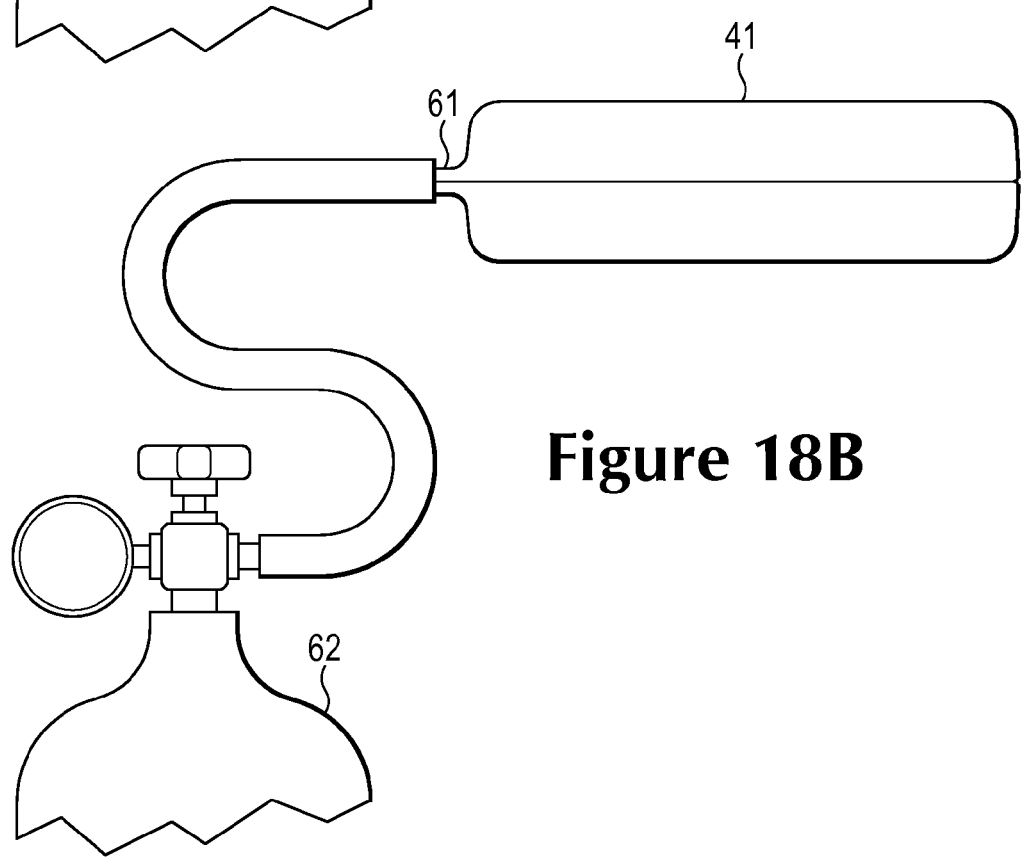

FIGS. 18A-18F depict aspects of an exemplary method of manufacturing pressure chamber 40. Referring to FIG. 18A, a substantially hollow and elongate bladder 41 is formed to include a fill inlet 61 through which bladder 41 may be pressurized. A variety of molding processes may be suitable for forming bladder 41, including blowmolding, rotational molding, two-film techniques, or thermoforming. With reference to FIG. 18B, a fluid pressurization source 62 may be connected to fill inlet 61, and bladder 41 may be pressurized to a first pressure through fill inlet 61. In some manufacturing methods, the connection of fluid pressurization source 62 to fill inlet 61 and the pressurizing of bladder 41 to a first pressure may be performed during the formation of bladder 41.

Figure 18C:
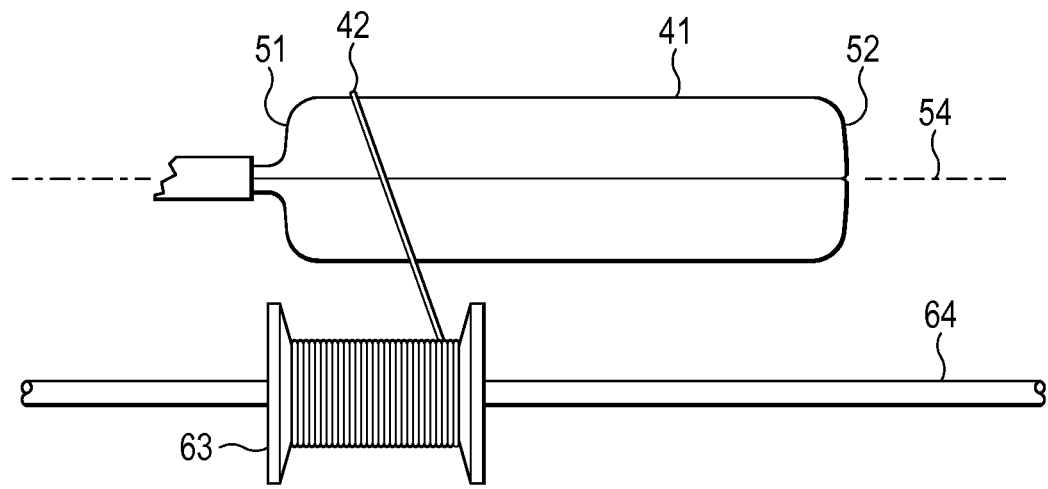
Figure 18D:
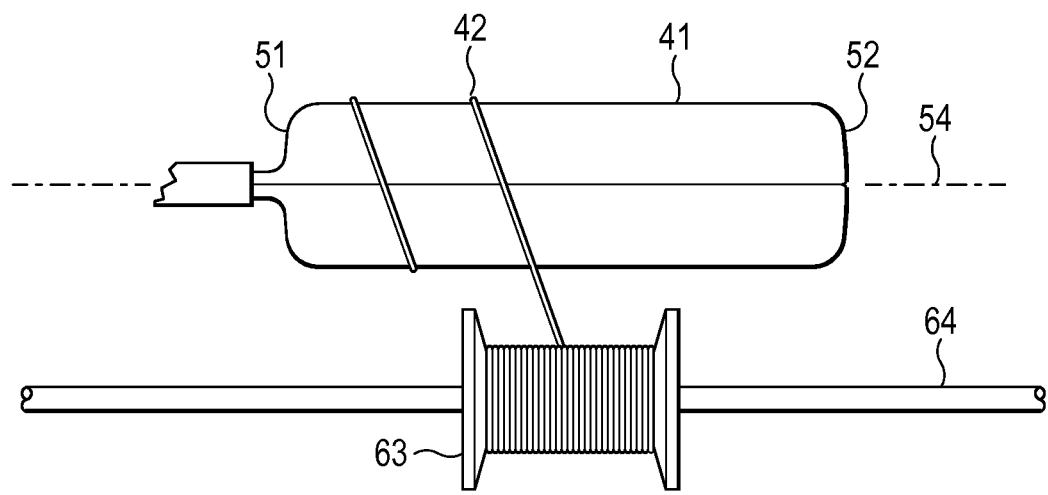
Figure 18E:
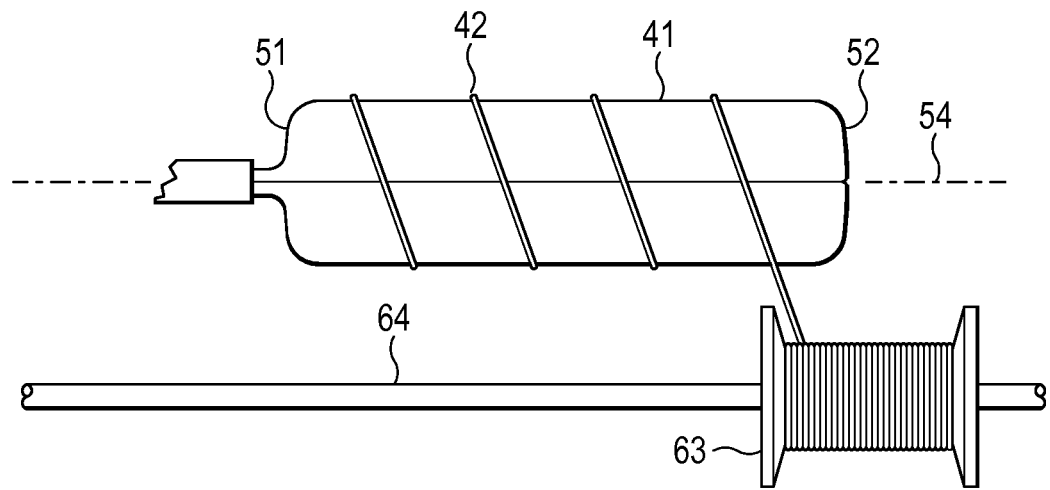

Once bladder 41 has been pressurized to the first pressure, strands 42 may be wound around bladder 41, as depicted in the series of FIGS. 18C-18E. When uninflated to the first pressure, the polymer material forming bladder 41 may collapse when wound with strands 42. By inflating bladder 41 to the first pressure, however, the fluid within bladder 41 may not collapse when wound with strands 42. In configurations where bladder 41 has sufficient structure to resist collapsing when wound with strands 42, the step of inflating bladder 41 to the first pressure may be removed from the manufacturing method.

In the process of winding strands 42 around bladder 41, strands 42 may unspool from a bobbin 63, and bladder 41 may rotate about its longitudinal axis 54 relative to the position of bobbin 63. In this method, bobbin 63 may be in a substantially fixed position, and bladder 41 may be substantially rotating around its longitudinal axis 54. However, other arrangements may be suitable to wind strands 42 around bladder 41. For example, in some manufacturing methods, bladder 41 may be substantially static, and bobbin 63 may be substantially rotating around about the longitudinal axis 54 of bladder 41. In other manufacturing methods, both bobbin 63 and bladder 41 may be substantially rotating about longitudinal axis 54, such that the combined effect of both rotations is that bladder 41 is effectively rotating about its longitudinal axis 54 relative to the position of bobbin 63.

In the process of winding strands 42 around bladder 41, bobbin 63 may also move along bobbin path 64, located away from but substantially parallel to longitudinal axis 54. Relative to end regions 51 and 52, bobbin 63 may move either from first end region 51 to second end region 52, or bobbin 63 may move from second end region 52 to first end region 51 along bobbin path 64. It will be understood that other positional relationships may exist between the first side and the second side. For example, first end region 51 could be above, to the right of, or below second end region 52.

Additionally, other arrangements may be suitable to wind strands 42 around bladder 41. For example, in some manufacturing methods, bobbin 63 may be in a substantially fixed position, and bladder 41 may move either from right to left or from left to right along its own longitudinal axis 54. In other manufacturing methods, bobbin 63 may move along bobbin path 64 in a first direction and bladder 41 may move along its own longitudinal axis 54 in a second direction, and the combined effect of both movements is that bobbin 63 is effectively moving from either from left to right or from right to left along bobbin path 64.

In the first exemplary manufacturing method, longitudinal axis 54 and bobbin path 64 are both substantially straight and parallel to each other and define a plane that divides the space in which the manufacturing apparatus lies into a first space on one side of the plane and a second space on the other side of the plane. In the first exemplary manufacturing method, the first space is above the plane, and the second space is below the plane. It will be understood that other positional relationships may exist between the first space and the second space. For example, the first space could be to the right of, below, or to the left of the second space.

As bladder 41 rotates about longitudinal axis 54 relative to the position of bobbin 64, the point of contact with unspooling strand 45 may be either in the first space or in the second space. In the first exemplary manufacturing method, the outer surface of bladder 41 may rotate away from bobbin 64 at the point of contact. However, in other manufacturing methods, the outer surface of bladder 41 may rotate toward bobbin 64 at the point of contact.

As bladder 41 substantially rotates about its longitudinal axis 54 relative to the position of bobbin 63, and as bobbin 63 moves along bobbin path 64, the generally helical configuration may be imparted to a winding of strands 42 around bladder 41. The direction of the imparted helical configuration (i.e., clockwise or counter-clockwise) is influenced by whether the point of contact with unspooling strands 42 (at which the outer surface of bladder 41 is rotating away from bobbin 63) is in the first space or in the second space. The direction of the imparted helical configuration is also influenced by whether bobbin 63 is moving from the first side of bobbin path 64 to the second side of bobbin path 64, or from the second side of bobbin path 64 to first side of bobbin path 64.

Four combinations of the two factors just described are possible. Two such combinations may result in a winding of a first helical handedness, while the other two may result in a winding of a second helical handedness opposite the first. For example, in the first exemplary manufacturing method, strands 42 may be wound around bladder 41 in a first winding, in which the point of contact with unspooling strands 42 (at which the outer surface of bladder 41 is rotating away from bobbin 63) is above the plane, and bobbin 63 is moving from left to right. Accordingly, the first winding may be of a first helical handedness. In a symmetrical manner, strands 42 may be wound around bladder 41 in a second winding, in which the point of contact with unspooling strands 42 (which is the point at which the outer surface of bladder 41 is rotating away from bobbin 63) is below the plane, and bobbin 63 is moving from right to left. Accordingly, the second winding may also be of the first helical handedness.

In contrast, strands 42 may be wound around bladder 41 in a third winding, in which the point of contact with unspooling strands 42 is above the plane, and bobbin 63 is moving from right to left; and, in a symmetrical manner, strands 42 may be wound around bladder 41 in a fourth winding, in which the point of contact with unspooling strands 42 is below the plane, and bobbin 63 is moving from left to right. Accordingly, the third winding and the fourth winding may each have a second helical direction opposite the first helical direction.

Once strands 42 has been wound around bladder 41, strands 42 may be secured to bladder 41. In the first exemplary manufacturing method, strands 42 are secured against bladder 41 by forming a polymer bond between strands 42 and bladder 41.

Figure 18F:
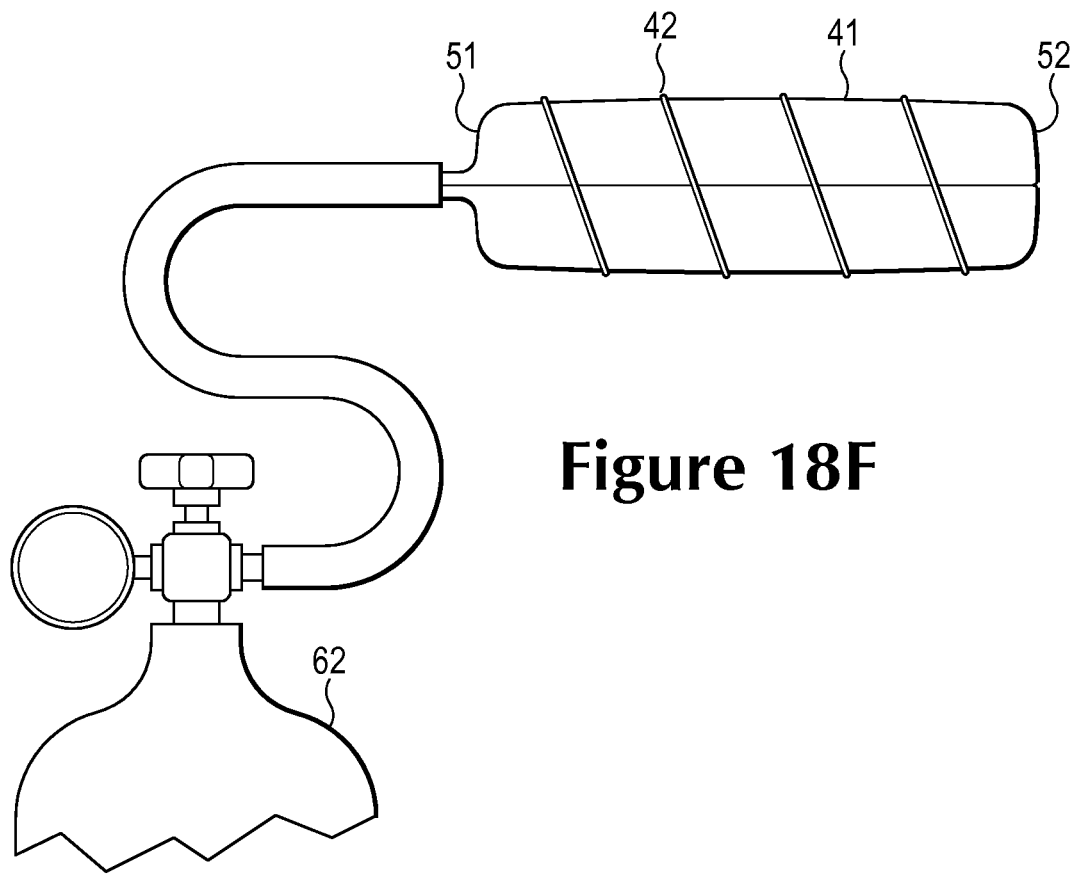

With reference to FIG. 18F, once strands 42 has been secured to bladder 41, bladder 41 may be pressurized to a second pressure, which is greater than the first pressure. In the manufacturing method, after bladder 41 has been formed and wound with strands 42, pressurization source 62 may be connected to fill inlet 61, and bladder 41 may be pressurized to a second pressure through fill inlet 61. The pressurization to a second pressure may introduce tension in strands 42, which may allow bladder 41 to be inflated to a relatively high pressure while expanding relatively little. In some configurations, fill inlet 61 may then be sealed to prevent fluid communication between the interior of bladder 41 and the exterior of bladder 41. In other configurations, fill inlet 61 may be coupled to a valve (e.g., valve 56) to allow fluid communication between the interior of bladder 41 and the exterior of bladder 41.

FIGS. 18A-18F depict a first exemplary method of manufacturing pressure chamber 40, as depicted in FIGS. 4-6B. A person having ordinary skill in the art will understand that these methods may be extended to manufacture further configurations of pressure chamber 40, such as the further configurations described above.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, the sole structure comprising:
    a midsole formed from a polymer foam material; and
    a pressure chamber at least partially located within the polymer foam material, the pressure chamber including a bladder that is sealed to enclose a pressurized fluid, and a strand bonded to an outer surface of the bladder and wound around the bladder, the strand being in tension.

2. The article of footwear recited in claim 1, wherein the strand is wound in a substantially helical configuration around the bladder.

3. The article of footwear recited in claim 1, wherein the bladder has a substantially cylindrical shape.

4. The article of footwear recited in claim 1, wherein a polymer bond secures the strand to the bladder.

5. The article of footwear recited in claim 1, wherein the strand is embedded within the outer surface of the bladder.

6. The article of footwear recited in claim 1, wherein at least a portion of the bladder is exposed at a side surface of the sole structure.

7. The article of footwear recited in claim 1, wherein the bladder is located in a heel region of the footwear.

8. An article of footwear comprising: an upper; and a sole structure secured to the upper, the sole structure including a pressure chamber, wherein the pressure chamber includes a bladder having an elongate configuration that defines a longitudinal axis, the bladder having two end regions, and the bladder being sealed in both end regions to enclose a pressurized fluid, and wherein the pressure chamber further includes a strand secured to an outer surface of the bladder, the strand being wound in a substantially helical configuration about the longitudinal axis, and the strand being in tension.

9. The article of footwear recited in claim 8, wherein the strand is embedded within the outer surface of the bladder.

10. The article of footwear recited in claim 8, wherein at least a portion of the bladder is exposed at a side surface of the sole structure.

11. The article of footwear recited in claim 8, wherein the bladder has a substantially cylindrical shape.

12. The article of footwear recited in claim 8, wherein the bladder is located in at least a lateral side region of the sole structure.

13. The article of footwear recited in claim 12, wherein another bladder is located in a medial side region of the sole structure.

14. The article of footwear recited in claim 12, wherein the bladder has a U-shaped configuration and is also located in a medial side region of the sole structure.

15. An article of footwear comprising: an upper; and a sole structure secured to the upper, the sole structure including a pressure chamber, wherein the pressure chamber includes a sealed bladder enclosing a pressurized fluid, the bladder having an elongate configuration that defines a longitudinal axis, and wherein the pressure chamber further includes a strand wound in a substantially helical configuration about the longitudinal axis, the strand being in tension and secured to the bladder by a polymer bond.

16. The article of footwear recited in claim 15, wherein the strand is embedded within an outer surface of the bladder.

17. The article of footwear recited in claim 15, wherein at least a portion of the bladder is exposed at a side surface of the sole structure.

18. The article of footwear recited in claim 15, wherein the bladder has a substantially cylindrical shape.

19. The article of footwear recited in claim 15, wherein the bladder is located in at least a lateral side region of the sole structure.

20. The article of footwear recited in claim 19, wherein another bladder is located in a medial side region of the sole structure.

21. The article of footwear recited in claim 19, wherein the bladder has a U-shaped configuration and is also located in a medial side region of the sole structure.

* * * * *